US008331725B2

(12) United States Patent
Forutanpour

(10) Patent No.: US 8,331,725 B2
(45) Date of Patent: Dec. 11, 2012

(54) PANORAMIC IMAGING TECHNIQUES

(75) Inventor: Babak Forutanpour, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1039 days.

(21) Appl. No.: 11/623,050

(22) Filed: Jan. 12, 2007

(65) Prior Publication Data

US 2008/0170803 A1 Jul. 17, 2008

(51) Int. Cl.
*G06K 9/36* (2006.01)
*G06K 9/32* (2006.01)

(52) U.S. Cl. ........ 382/284; 382/289; 382/293; 382/294; 382/296

(58) Field of Classification Search .................. 382/284, 382/289, 932, 294, 296
See application file for complete search history.

(56) References Cited

U.S. PATENT DOCUMENTS

| | | | |
|---|---|---|---|
| 6,456,323 | B1 | 9/2002 | Mancuso et al. |
| 6,714,689 | B1* | 3/2004 | Yano et al. ............ 382/284 |
| 7,015,954 | B1* | 3/2006 | Foote et al. ............ 348/218.1 |
| 7,085,435 | B2* | 8/2006 | Takiguchi et al. ....... 382/294 |
| 7,409,105 | B2 | 8/2008 | Jin et al. |
| 2005/0089244 | A1* | 4/2005 | Jin et al. ............... 382/284 |
| 2006/0088191 | A1* | 4/2006 | Zhang et al. ........... 382/107 |
| 2006/0239571 | A1* | 10/2006 | Dong et al. ............ 382/236 |
| 2006/0285732 | A1* | 12/2006 | Horn et al. ............. 382/128 |
| 2007/0025615 | A1* | 2/2007 | Zhou et al. ............. 382/173 |
| 2009/0208115 | A1* | 8/2009 | Abe ..................... 382/209 |
| 2010/0171846 | A1* | 7/2010 | Wood et al. ............ 348/231.99 |

FOREIGN PATENT DOCUMENTS

| | | |
|---|---|---|
| EP | 0913991 | 5/1999 |
| JP | 5303643 A | 11/1993 |
| JP | 6508461 T | 9/1994 |
| JP | 9090530 A | 4/1997 |
| JP | 9097326 A | 4/1997 |
| JP | 10083442 A | 3/1998 |
| JP | 11167640 A | 6/1999 |
| JP | 2001094857 A | 4/2001 |
| JP | 2002042125 A | 2/2002 |
| JP | 2005269528 A | 9/2005 |
| WO | 9312501 | 6/1993 |

OTHER PUBLICATIONS

Linhong et al., "A Stitching Algorithm of Still Pictures with Camera Translation," 2002, IEIC Technical Report (Institute of Electronics, Information and Communication Engineers), vol. 101, No. 701(MVE2001 145-148, pp. 1-6.*
Deng et al., "Generating Panorama Photos", Hewlett Packard Tech Report, 2003.*
International Search Report—PCT/US08/050869—International Search Authority, European Patent Office—Jun. 9, 2008.
Written Opinion—PCT/US08/050869—International Search Authority, European Patent Office—Jun. 9, 2008.

* cited by examiner

*Primary Examiner* — Anand Bhatnagar
*Assistant Examiner* — Soo Park
(74) *Attorney, Agent, or Firm* — George C. Pappas; James R. Gambale, Jr.

(57) ABSTRACT

A wireless device or camera phone device that is adapted to create in the device a larger, panoramic image of two photographic images provided the two images have a common overlapping region. The panoramic image can be created even if the two images are at different rotations or perspectives. The device corrects for any rotational differences prior to creating the panoramic image.

13 Claims, 32 Drawing Sheets

PANORAMIC IMAGING TECHNIQUES

BACKGROUND

I. Field

The present disclosure relates generally to image processing, and more specifically to techniques for forming a panoramic image.

II. Background

Currently, panoramic images cannot be created in a camera device or a camera phone device. Instead, when generating panoramic images from individual digital images having some common overlapping region, it is required to load the pictures to a personal computer (PC) where software for creating panoramic images can be used. This software is not suitable for use in a camera device having limited power, memory and processing capabilities.

Moreover, some current methods for generating panoramic images are very time consuming and not user friendly. Oftentimes, the two images being used to create the panoramic image are rotationally offset. Thus, a panoramic image cannot be created or if one is created, it is visually unattractive. For example, the panoramic image of FIG. 4 was created using a conventional process on the images FIGS. 3A and 3B. While the conventional process was able to merge the two images of FIGS. 3A and 3B, the seam is diagonal and in a bad place.

There is therefore a need in the art for techniques to automatically generate panoramic images using a camera device or camera phone device, and does so automatically, with special care for correcting any rotational differences between individual images.

SUMMARY

Techniques to automatically generate panoramic images using a camera device automatically with special care for correcting any rotational differences between two individual images are described herein. In one embodiment, a wireless device having a processor operative to stitch together a left image and a right image having overlapping regions is provided. The process also automatically corrects for any rotational differences between the left and right images before stitching to create a larger panoramic image. A memory coupled to the processor is included.

In another aspect, a processor has a video processing unit operative to automatically correct for a rotational difference, above a predetermined limit, between first and second selected images having a common overlapping region. The video processing unit is operative to stitch the first image to the second image to create a larger panoramic image at a calculated stitching location when the rotational difference is below the predetermined limit. The video processing unit is operative to stitch the first image to a rotated second image at a rotated stitching location when the rotational difference is above the predetermined limit. A memory unit is coupled to the video processing unit In another aspect, a computer program product includes a machine-readable medium having instructions for causing a machine to find, automatically, an ideal stitching location in a second image to stitch a first image, the first and second images having a common overlapping region. The instructions also cause a machine to correct, automatically, the second image for rotational differences between the first and second images in relation to the ideal stitching location to form a new rotated ideal location. Additionally, the instructions cause a machine to stitch, automatically, the first image to the second image to generate a larger panoramic image using the new rotated ideal location.

Various aspects and embodiments of the disclosure are described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein may be used for wireless communication, computing, networking, personal electronics, etc. An exemplary use of the techniques for wireless communication is described below.

Figure 2:
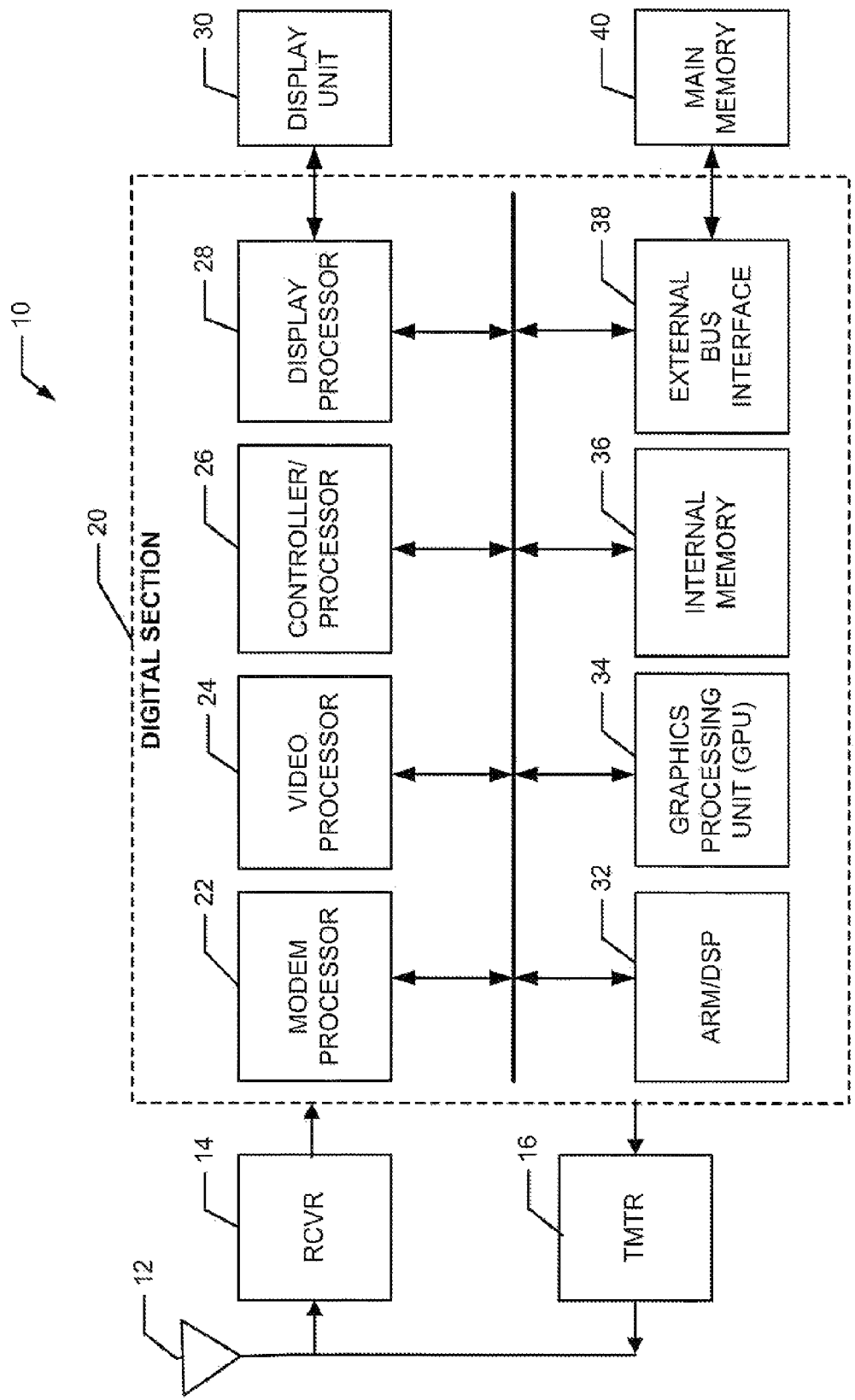
FIG. 2 illustrates a wireless device.

FIG. 2 shows a block diagram of an embodiment of a wireless device 10 in a wireless communication system. The wireless device 10 may be a cellular or camera phone, a terminal, a handset, a personal digital assistant (PDA), or some other device. The wireless communication system may be a Code Division Multiple Access (CDMA) system, a Global System for Mobile Communications (GSM) system, or some other system.

The wireless device 10 is capable of providing bi-directional communication via a receive path and a transmit path. On the receive path, signals transmitted by base stations are received by an antenna 12 and provided to a receiver (RCVR) 14. The receiver 14 conditions and digitizes the received signal and provides samples to a digital section 20 for further processing. On the transmit path, a transmitter (TMTR) 16 receives data to be transmitted from the digital section 20, processes and conditions the data, and generates a modulated signal, which is transmitted via the antenna 12 to the base stations.

The digital section 20 includes various processing, interface and memory units such as, for example, a modem processor 22, a video processor 24, a controller/processor 26, a display processor 28, an ARM/DSP 32, a graphics processing unit (GPU) 34, an internal memory 36, and an external bus interface (EBI) 38. The modem processor 22 performs processing for data transmission and reception (e.g., encoding, modulation, demodulation, and decoding). The video processor 24 performs processing on video content (e.g., still images, moving videos, and moving texts) for video applications such as camcorder, video playback, and video conferencing. The controller/processor 26 may direct the operation of various processing and interface units within digital section 20. The display processor 28 performs processing to facilitate the display of videos, graphics, and texts on a display unit 30. ARM/DSP 32 may perform various types of processing for the wireless device 10. The graphics processing unit 34 performs graphics processing.

The techniques described herein may be used for any of the processors in the digital section 20, e.g., the video processor 34. The internal memory 36 stores data and/or instructions for various units within the digital section 20. The EBI 38 facilitates the transfer of data between the digital section 20 (e.g., internal memory 36) and a main memory 40.

The digital section 20 may be implemented with one or more DSPs, micro-processors, RISCs, etc. The digital section 20 may also be fabricated on one or more application specific integrated circuits (ASICs) or some other type of integrated circuits (ICs).

The techniques described herein may be implemented in various hardware units. For example, the techniques may be implemented in ASICs, DSPs, RISCs, ARMs, digital signal processing devices (DSPDs), programmable logic devices (PLDs), field programmable gate arrays (FPGAs), processors, controllers, micro-controllers, microprocessors, and other electronic units.

Figure 6A:
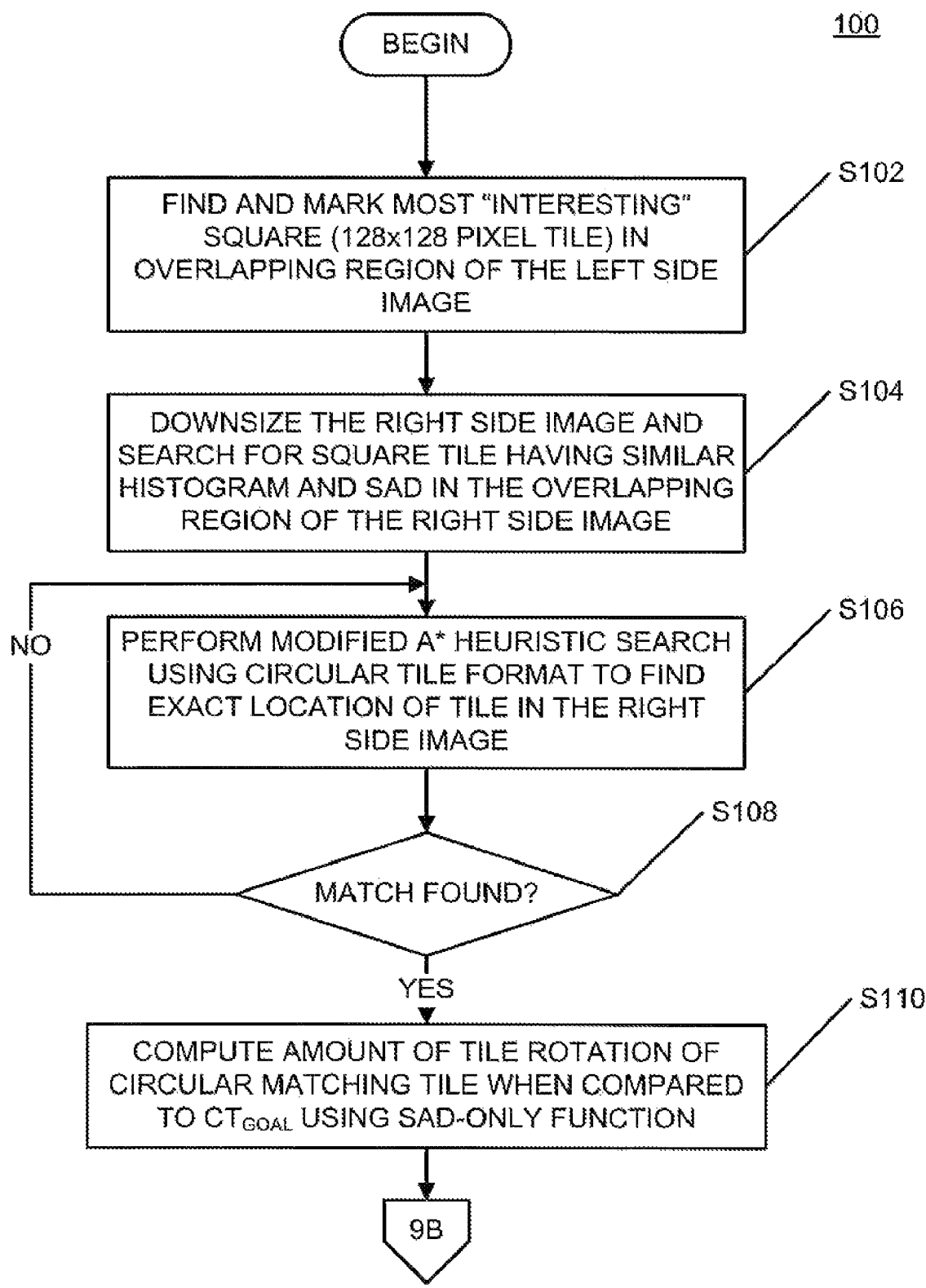
FIGS. 6A and 6B illustrate a flowchart of the process to create a panoramic image.
Figure 6B:
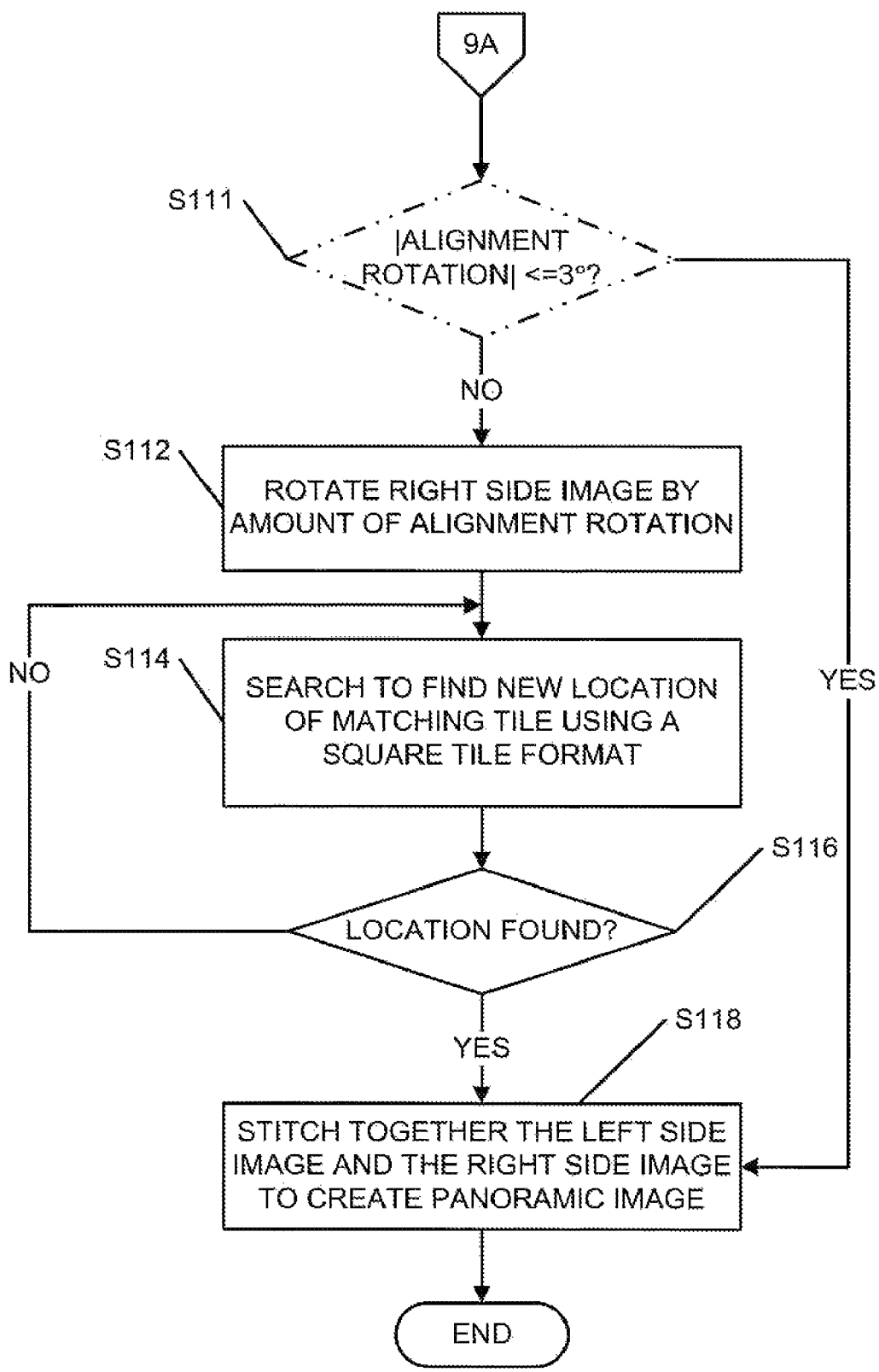

The wireless device 10 further comprises panoramic processing software that is stored in internal memory 36 or other computer-readable medium, for carrying out a process for stitching two photographic images together to create a single panoramic image, generally designated as 100, shown in FIGS. 6A-6B. Furthermore, the internal memory 36 may store still images, such as shown in FIGS. 1A, 1B, 3A, 3B and 31A-31B, photographic images or video clips therein which can be selected by the user for automatic processing using the panoramic processing software. The panoramic processing software upon execution is capable of seamlessly compositing together two photographic images taken of a scene from different perspectives, even different rotations, provided there is some common overlapping region.

Figure 10:
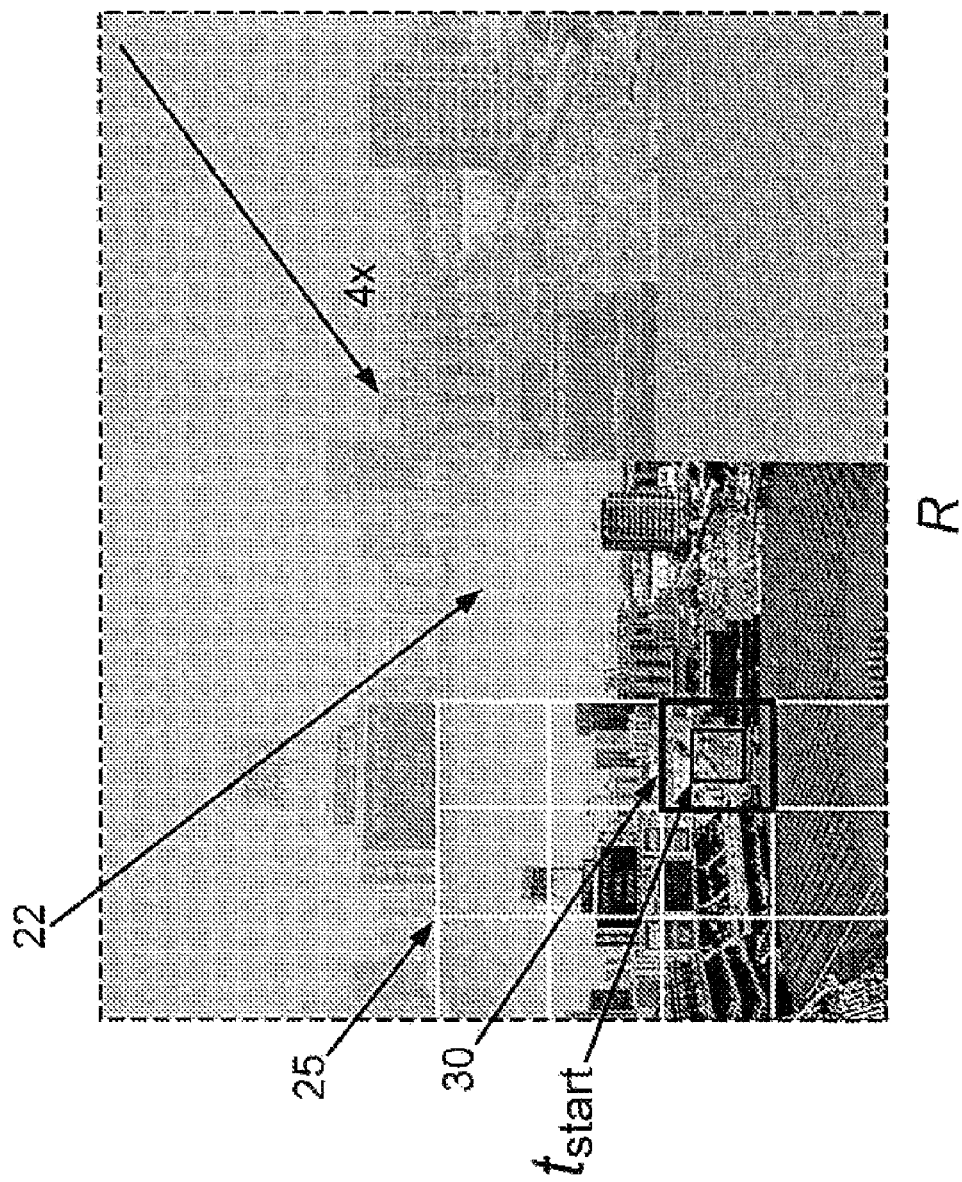
FIG. 10 illustrates the right photographic image of FIG. 1B with the tile or point $t_{start}$ marked in a reduced overlapping region.

FIGS. 6A and 6B illustrate a flowchart of the process 100 to create a panoramic image. The process 100 stitches two photographic images (FIGS. 1A and 1B) together. The two photographic images (FIGS. 1A and 1B) are denoted, for illustrative purposes, as a left photographic image L in FIG. 8 and a right photographic image R in FIG. 10, given there exists a common overlapping region. The process 100 begins with step S102 where the "most interesting" square tile is found and marked in a tight area of the common overlapping region of the left photographic image L. In the exemplary embodiment, a square tile is a 128×128 pixel tile. The overlapping tight area in the left photographic image L is denoted as $L_{overlap}$. The process carried out in step S102 is described in detail below in relation to FIG. 7.

The description of the processes described herein in relation to the left and right images can be reversed. For example, the manipulations and calculations related to the left image can be performed on the right image. Likewise, the manipulations and calculations related to the right image can be performed on the left image. Furthermore, portions of the left and right images form left and right sides of the generated panoramic image. Hence, the left and right sides could be substituted with top and bottom images of a scene with a common overlapping region.

Step S102 is followed by step S104 where the right photographic image R is downsized in the 2 dimensions by 2× for a total of 4× (4 times) reduction, as best seen in FIG. 10. Likewise, the common overlapping region in the right image is downsized by the same factor. The size of the right photographic image R is shown in the dotted line around the border. The reduced overlapping area $R_{overlap}$ is generally the common overlapping region in the right image R and is an array of candidate square or pixel tiles. Each candidate square or pixel tile is essentially the same size as the squares in the area $L_{overlap}$. The reduced overlapping area $R_{overlap}$ is shown as a 3×4 array 25 of candidate square tiles. After the right photographic image R is downsized 4 times, a starting tile is found in the reduced overlapping area $R_{overlap}$ having a similar (lowest) cost function f(t) derived from the histogram and sum of absolute difference (SAD) of the tile which most closely matches tile $t_{goal}$. The square starting tile which most closely matches tile $t_{goal}$ is the tile denoted as 30.

Thereafter, the center of the square tile 30 is marked as $t_{start}$. The center $t_{start}$ is a "sweet spot" or ideal starting spot or tile for starting the Modified A*Heuristic Search at step S106. At step S106, a search is conducted to find a perfect or ideal stitching tile in the overlapping area $R_{overlap}$ which is a match to the tile $t_{goal}$. At step S106 a circular footprint 40 (hereinafter "circular tile") within the boundaries of the square tile $t_{goal}$ is used to compare image hues in the images L and R in order to avoid pitfalls caused by rotation and difference in lighting between two photographic images. Step S106 is followed by step S108 where a determination is made whether a match is found during the Modified A*Heuristic Search. If the determination is "YES," (meaning a match is found) step S108 is followed by step S110 where the amount of rotation (in degrees) or alignment rotation of the matching tile in the image R to match the tile $t_{goal}$ in the image L is computed. However, if the determination at step S108 is "NO," (meaning no match) then step S108 returns to step S106 to continue the Modified A*Heuristic Search.

Figure 25B:
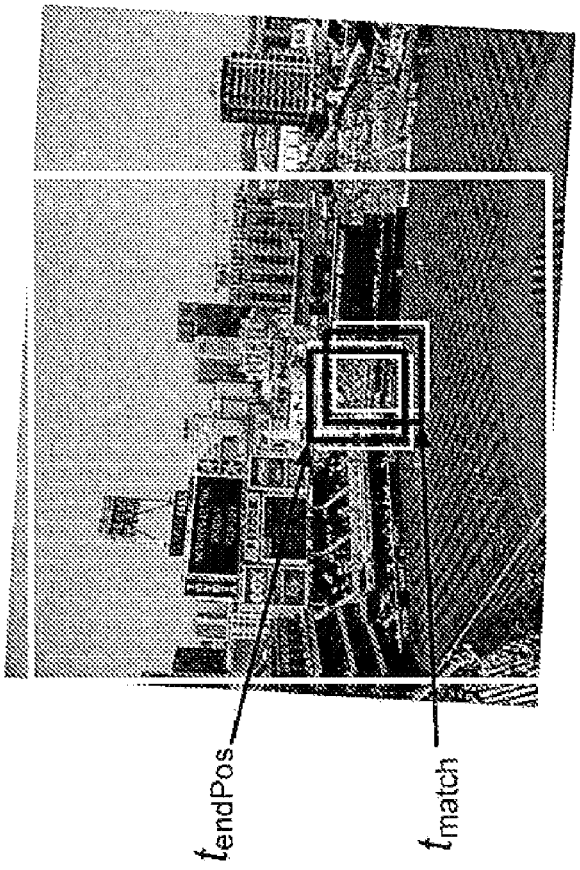
FIG. 25B illustrates a rotated right photographic image of FIG. 1B with $t_{endPos}$ and $t_{match}$ designated.

Returning to step S110, step S110 is followed by step S111 (shown in phantom) where a determination is made whether the absolute value of the alignment rotation is less than or equal to (<=) three degrees (3°). If the determination is "NO," then step S111 is followed by step S112 where the right photographic image R is rotated by the number of degrees computed at step S110. The rotated right photographic image R is denoted as $R_{rotated}$ (FIG. 25B). However, if the determination at step S111 is "YES," then step S111 is followed by step S118 to skip the rotation of the right image. This is an optimization feature which allows the rotation process to be skipped to save computations when the amount of alignment rotation is small or negligible. The phantom lines of step S111 indicates the step is optional.

Figure 30:
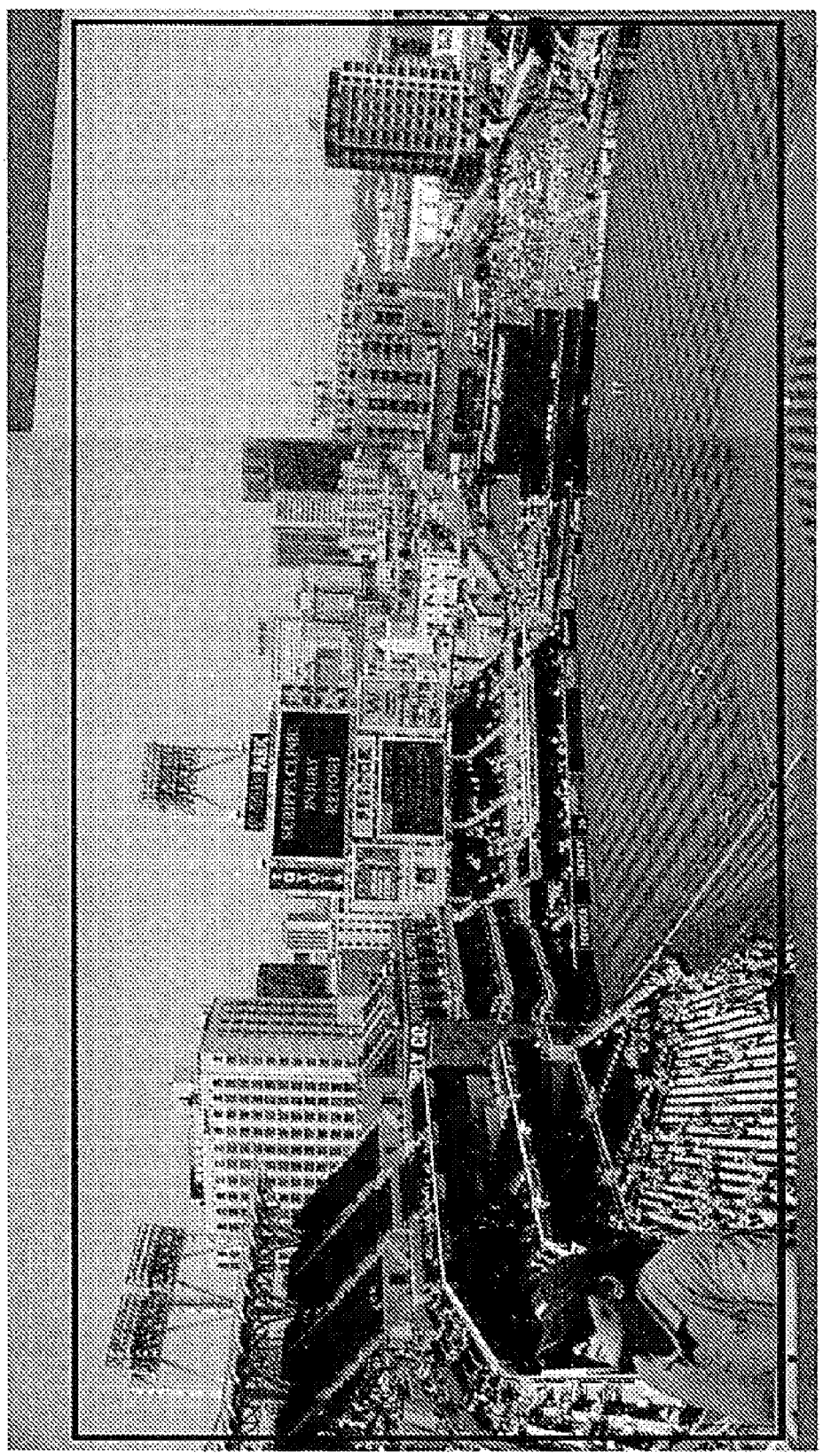
FIG. 30 illustrates a panoramic image representative of the left and right photographic images of FIGS. 1A and 1B using the process to create a panoramic image.

Step S112 is followed by step S114. At step S114 a search is performed again to find a new location of the matching perfect or ideal stitching tile. However, the full square footprint of the ideal stitching tile is used. The search uses a SAD-only function. Step S114 is followed by step S116 where a determination is made whether a location is found. If the determination is "YES," (meaning a location is found) step S116 is followed by step S118 where the left photographic image L is stitched together with the right photographic image R (if the alignment rotation is less than 3°) or the rotated photographic image $R_{rotated}$ to create a larger, panoramic image (FIG. 30).

Figure 7:
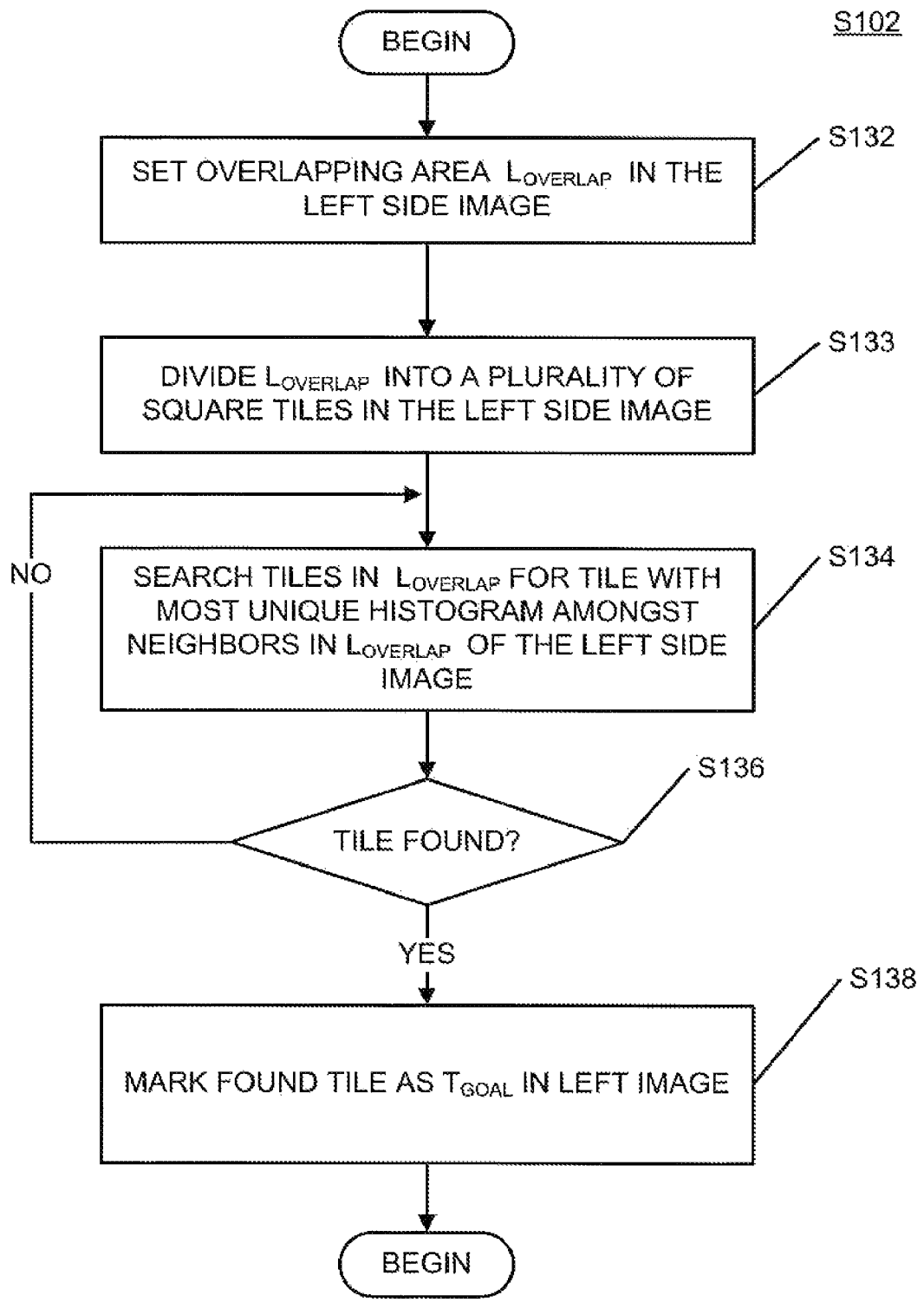
FIG. 7 illustrates a flowchart of the process to find and mark the "most interesting" tile in an overlapping region of one of the photographic images of the left and right photographic images to be stitched.

Referring to FIG. 7, a flowchart of step S102, the process to find and mark the "most interesting" square tile $t_{goal}$, is shown. With specific reference also to FIG. 8, a predetermined tight area denoted as $L_{overlap}$ in the left photographic image L which overlaps the right photographic image R is determined at step S132 and divided into an array of square tiles 20 at step S133. In the exemplary embodiment, the predetermined tight area L.sub.overlap is size constrained.

The width constraint of the area $L_{overlap}$ is ⅕ of the left photographic image L beginning from the rightmost edge. The height constraint of the area $L_{overlap}$ is 7/10 (0.7) of the height of the left photographic image. Thus, when measured from the horizontal midline or horizon of the left photographic image L, the area $L_{overlap}$ extends 0.35 of the height in the image L in the up direction and 0.35 of the height in the image L in the down direction. In other words, the area $L_{overlap}$ does not extend completely to the top and bottom edges of the left photographic image L and is generally centered about the median line or horizon. As can be appreciated the constraints in width and height can be varied and are programmable.

Furthermore, the area $L_{overlap}$ is divided into a plurality of square tiles, with each tile being the same pixel size. Here, the size of the square tile is selected to be 128×128. The number of square tiles in the area $L_{overlap}$ is eight (8), such tiles are arranged in the array 20 of square tiles. The array 20 of square tiles is 2×4. The number of tiles in or size of the array 20 is a function of the programmed parameters such as the tile size, width and height constraints, etc. and/or the overlap between the image L and R.

Returning again to FIG. 7, step S133 is followed by step S134 where a search is conducted for a tile in the area $L_{overlap}$ that is most unique such that: a) the histogram of the tile in the area $L_{overlap}$ is most unique amongst neighbors and b) the histogram has the most even distribution of the Luma and Chroma (i.e. lots of color). Step S134 is followed by step S136 where a determination is made whether the "most interesting" tile is found in comparison with all of its neighbors in the array 20. If the determination at step S136 is "YES," then step S136 is followed by step S138 where the tile is marked or set to $t_{goal}$. In the exemplary embodiment, the tile $t_{goal}$ is shown marked in the first column, third row. For illustrative purposes, the lines defining the array 20 are white and the tile $t_{goal}$ is black. As can be appreciated, the tile $t_{goal}$ is found so that it has a lot of detail and color.

Figure 1B:
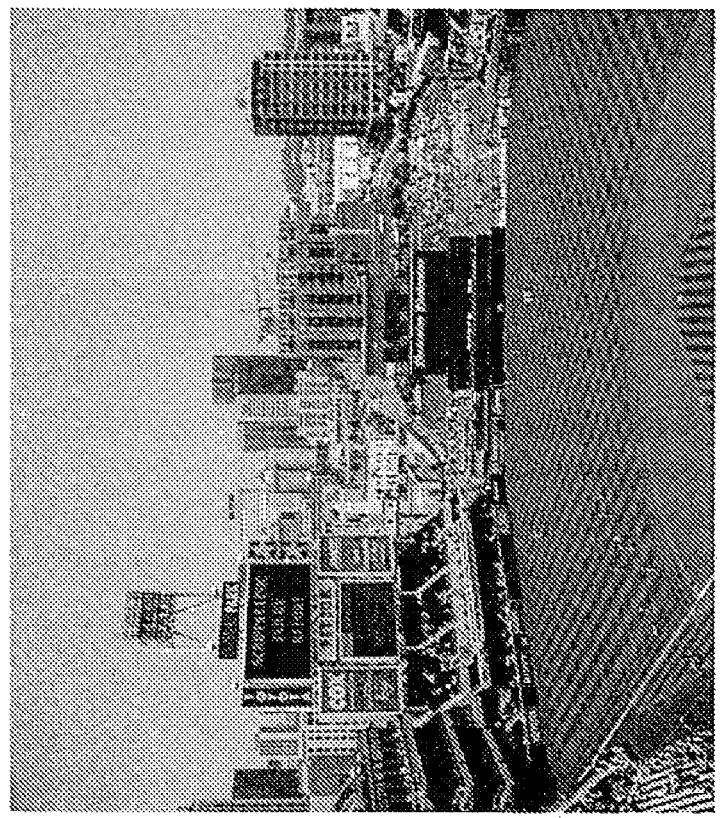
FIGS. 1A and 1B illustrate a pair of left and right photographic images of a scene wherein a portion of the left and right photographic images overlap.
Figure 1A:
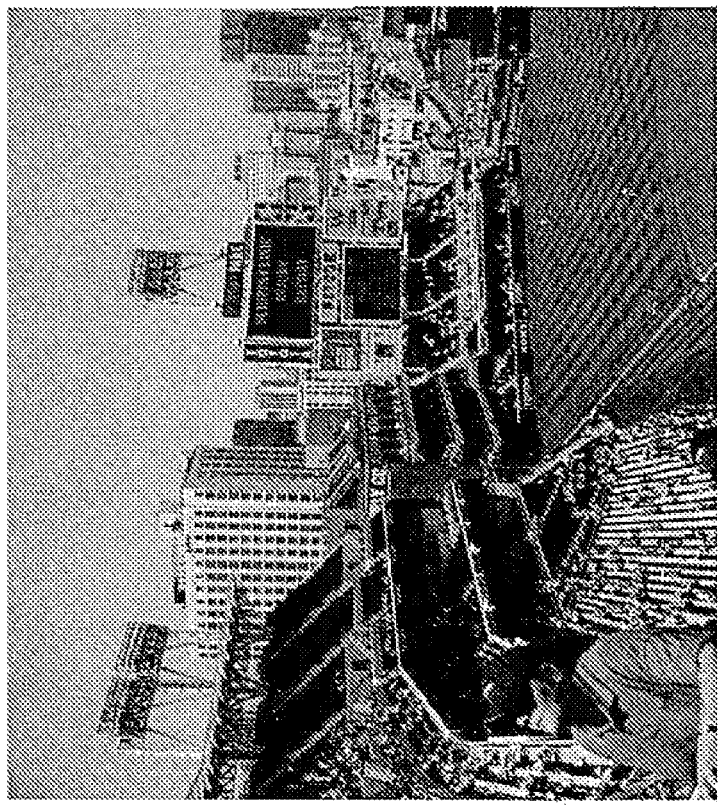
Figure 8:
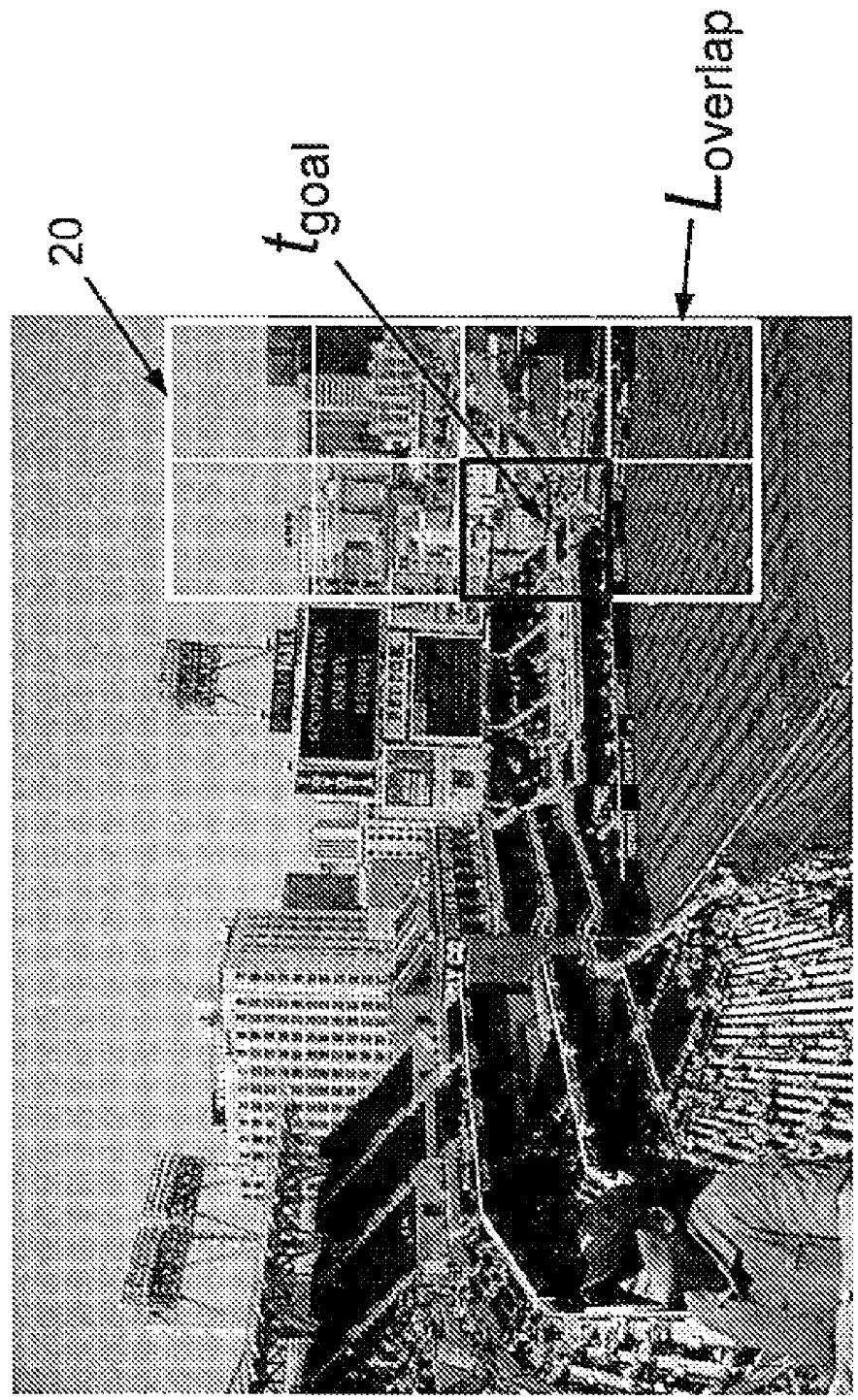
FIG. 8 illustrates the left photographic image of FIG. 1A with an overlapping area $L_{overlap}$ marked.

FIG. 8 illustrates the left photographic image of FIG. 1A with an overlapping area $L_{overlap}$ marked. In FIG. 8, for each square (pixel) tile, the Chroma or color has a range between 32 to 256 and is programmable. Luma is the gray scale (brightness) of pixels.

Figure 9:
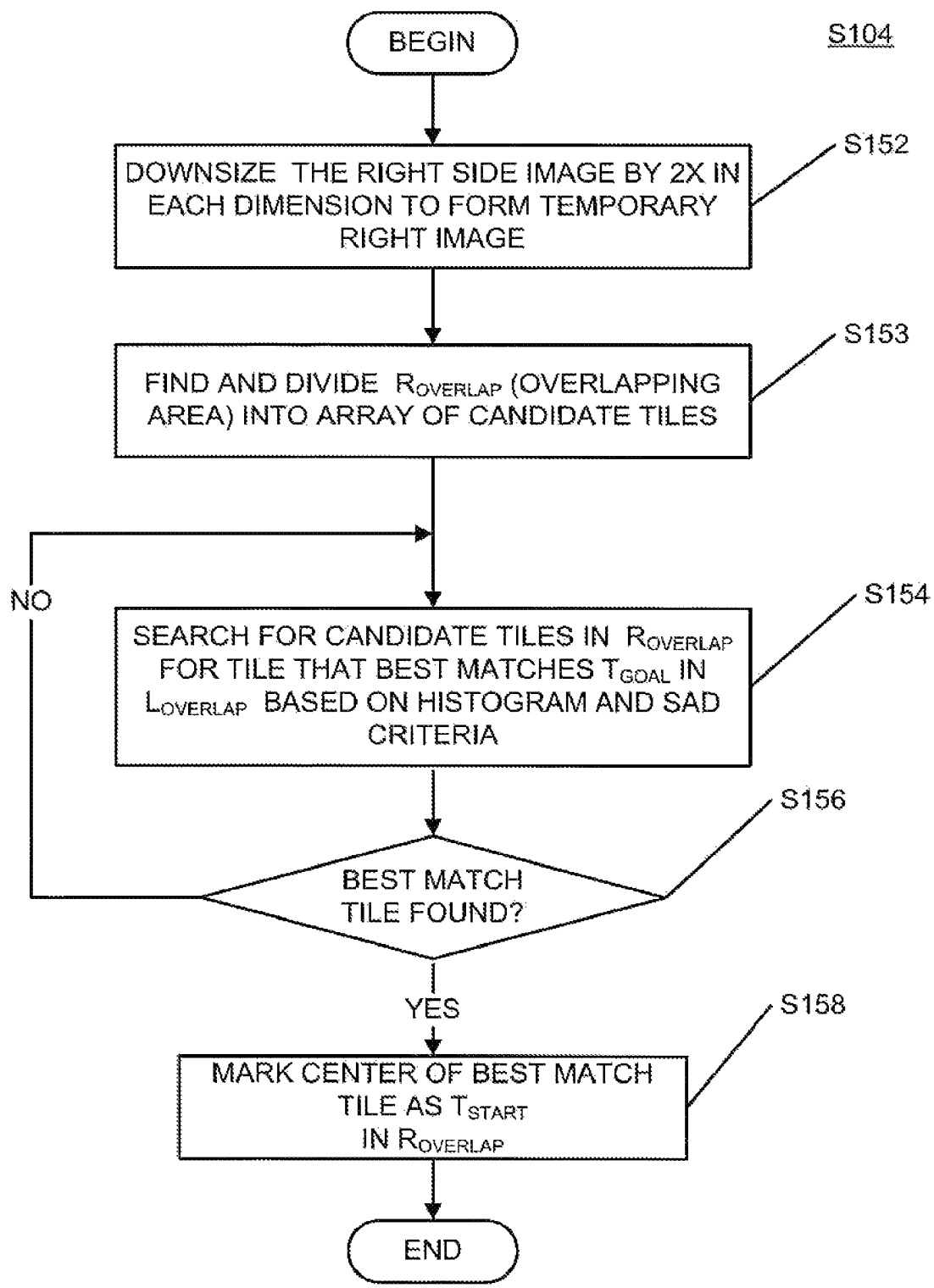
FIG. 9 illustrates a flowchart of the process to downsize and find the tile or point $t_{start}$ in the right photographic image of FIG. 1B.

FIG. 9 illustrates a flowchart of the process of step S104 to downsize and find the tile or point $t_{start}$ in the right photographic image of FIG. 1B. FIG. 10 illustrates the right photographic image of FIG. 1B with the tile or point $t_{start}$ marked in a reduced overlapping region. The process of step S104 begins with step S152 where the right photographic image R is downsized two times in each dimension so it is ¼ of the original size or aspect ratio to form a temporary right image 22. Step S152 is followed by step S153 where the reduced overlapping area $R_{overlap}$ (FIG. 13) in the temporary right image 22 is found. The reduced overlapping area $R_{overlap}$ in the right image R is selected to be greater than (>) ½ of the width of the temporary right image 22. Here the width is selected to be ⅗ of the width of the temporary right image 22. The height is selected to be 100% of the temporary right image 22. Hence, the reduced overlapping area $R_{overlap}$ extends to the right and bottom borders of the temporary right image 22.

Furthermore, during step S153, the overlapping area $R_{overlap}$ is then divided into a plurality of candidate square tiles of equal size to form an array 25. The size of the candidate square tiles in the area $R_{overlap}$ is equal to the size of the square tiles in the area $L_{overlap}$. Based on the constraints, the array 25 has 12 square tiles arranged in a 3×4 array with all candidate square tiles having a corresponding overlapping or common image portion with the left photographic image L.

Step S153 is followed by step S154 where a search for a tile in the area $R_{overlap}$ which best looks like or matches tile $t_{goal}$ previously found in the area $L_{overlap}$ is conducted using a cost function f(t) in equation Eq.(1). The cost function f(t) has two criteria to evaluate the candidate tile during the search which best looks like or matches $t_{goal}$. The two criteria include: (1) the histogram of the candidate tile which compares each candidate tile of the array 25 with the Luma of the tile $t_{goal}$; and (2) the SAD which best matches tile $t_{goal}$. When computing the SAD, each candidate tile in the area $R_{overlap}$ of the right photographic image R is compared to the tile $t_{goal}$ of the area $L_{overlap}$ in the left photographic image L. Then, a pixel by pixel or point by point subtraction between the two tiles (a candidate tile in the area $R_{overlap}$ and the tile $t_{goal}$ of $L_{overlap}$) is performed.

If the two tiles under comparison are identical, then the result would be zero or black (meaning the two tiles are matched). However if two tiles are completely different, the result of the subtraction would yield a bigger number (meaning the two tiles do not match). The SAD operation is similar to a minimization function to find which tiles of the candidate tiles in the array 25 have the most number of colors that match the tile $t_{goal}$ and which SAD is the best (the lowest SAD number).

Step S154 is followed by step S156 where a determination is made whether the best tile in array 25 which matches the tile $t_{goal}$ (FIG. 26A) is found. Here the tile which matches the tile $t_{goal}$ is denoted as 30. If the determination is "YES," step S156 is followed by step S158 where the center of the tile 30 is marked as $t_{start}$ in the area $R_{overlap}$. However, if the determination is "NO," the search in step S154 is continued. Upon visual inspection of FIGS. 8 and 10, one can readily see that the tile $t_{goal}$ and the tile 30 having the $t_{start}$ are relatively close.

Figure 11B:
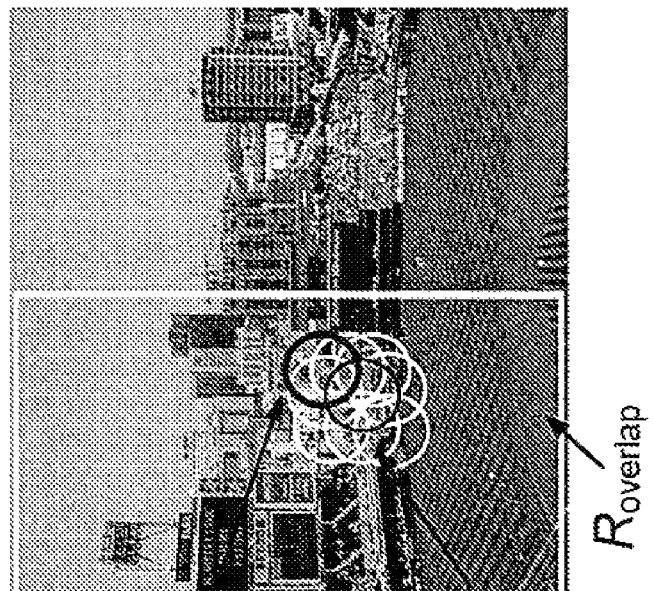
FIGS. 11A and 11B illustrate the left and right photographic images of FIGS. 1A and 1B with $ct_{goal}$, $ct_{start}$, and $ct_{endPos}$ designated.
Figure 11A:
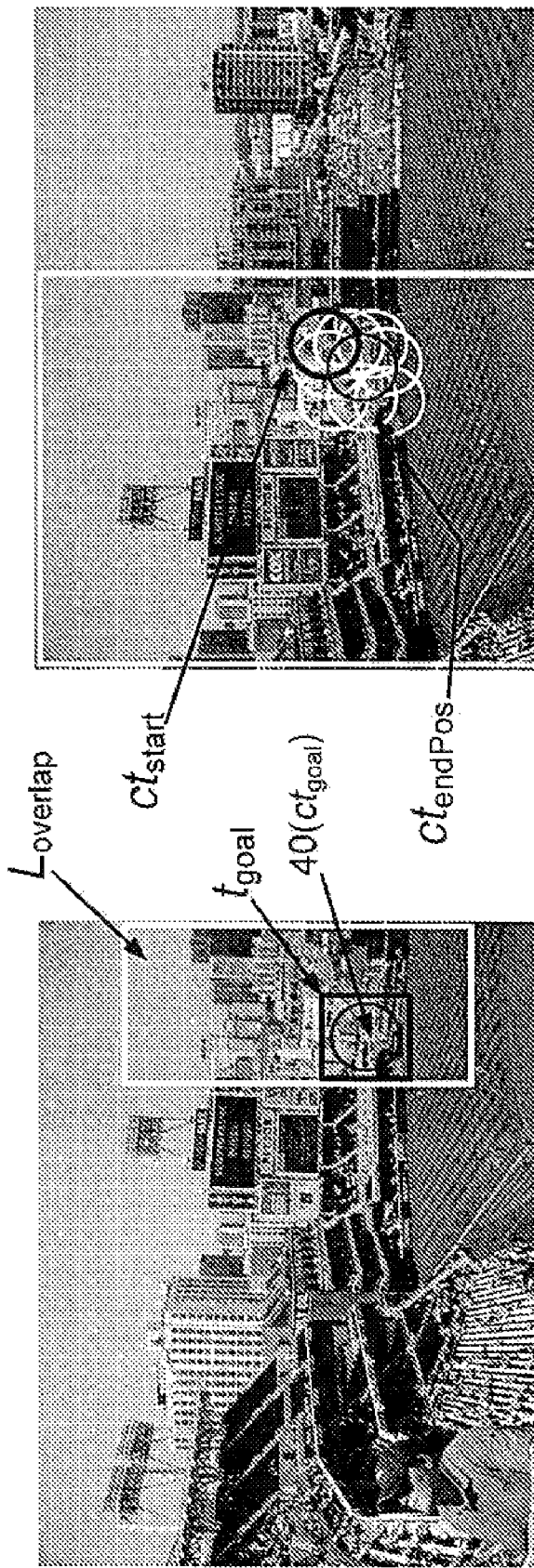
Figure 26E:
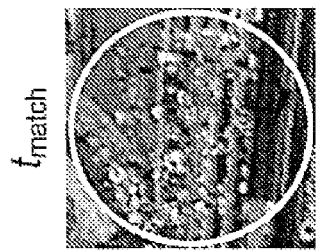
FIG. 26E illustrates the $t_{match}$ tile.

FIGS. 11A and 11B illustrate the left and right photographic images of FIGS. 1A and 1B with $ct_{goal}$, $ct_{start}$, and $ct_{endPos}$ designated. The Modified A*Heuristic Search is begun at the square tile $t_{start}$ (FIG. 26B) using a circular tile therein denoted as $ct_{start}$ in the area $R_{overlap}$. It should be noted that the area $R_{overlap}$ in FIG. 11B is the same area $R_{overlap}$ in the downsized temporary image 22. The area $R_{overlap}$ in FIG. 11B is 256×256 with the circular tile $ct_{start}$ shown as a bold black circle. The circular tile found to be the ideal stitching tile denoted as $ct_{endPos}$ in the area $R_{overlap}$ at the end of the Modified A*Heuristic Search and is shown in as a black circle in the right image R. The Modified A*Heuristic Search calculates the cost function f(t) defined in equation Eq.(1) as $$f(t) = wh_{all} * \text{histogramDiff}_{all}(t, t\text{goal}) + ws * \text{location Diff}(t, t\text{goal}) \quad \text{Eq. (1)}$$

where the function histogramDiff$_{all}$(t,tgoal) compares each candidate circular tile's histogram array to the histogram array of $ct_{goal}$; the function locationDiff(t,tgoal) determines a SAD result between each candidate circular tile and the circular tile $ct_{goal}$; $wh_{all}$ is a weight between 0 and 1; ws is the weight on the SAD result between 0 and 1; and $wh_{all}$ plus ws equals 1. The default for $wh_{all}$ and ws is 0.5 so that the histogram result and the SAD result can be treated equally. Nevertheless, $wh_{all}$ or ws may be weighted more than the other. The component $wh_{all}$*histogram Diff$_{all}$(t,tgoal) is made up of four (4) sub-functions described later.

Figure 29:
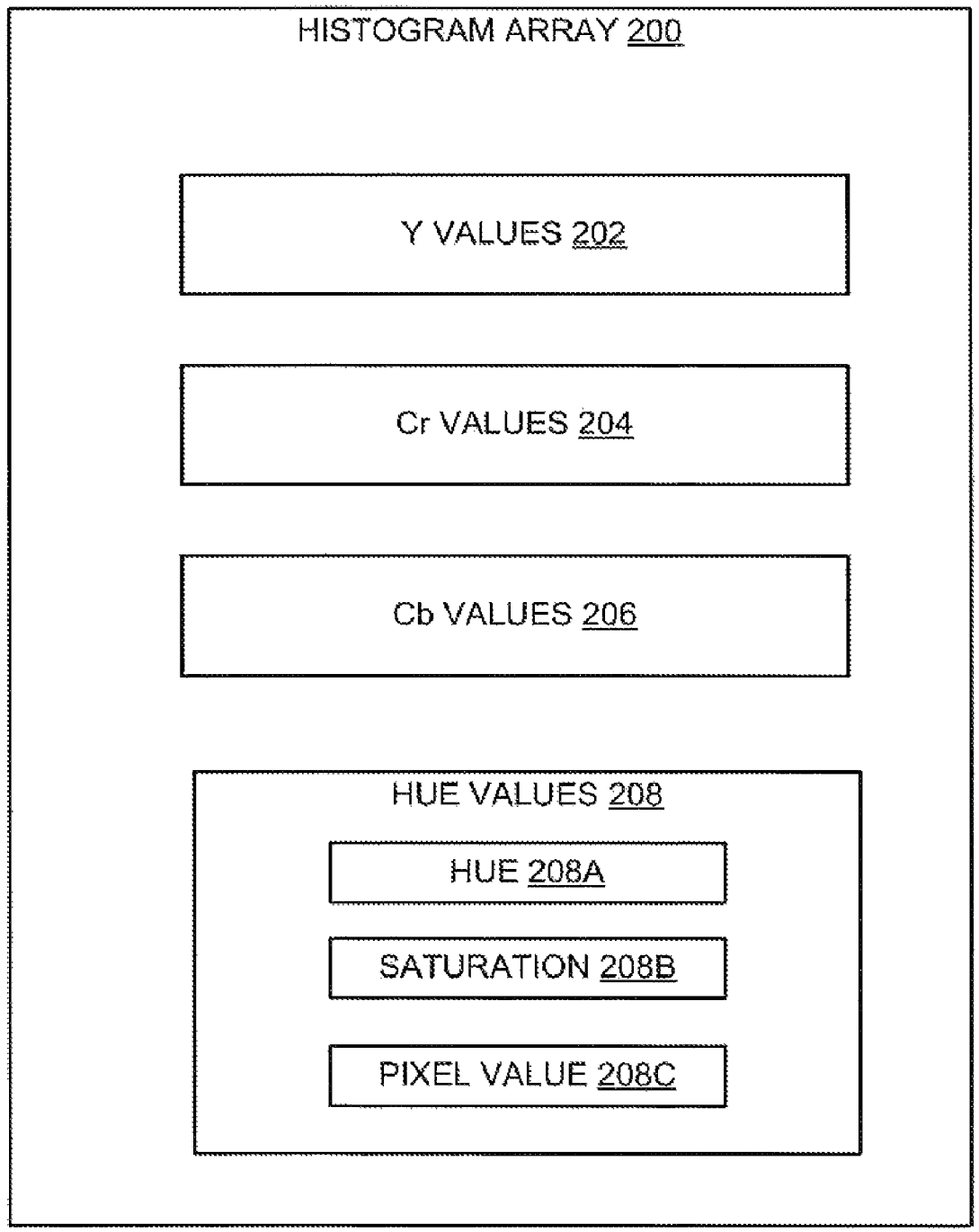
FIG. 29 illustrates a general block diagram of a histogram array.

FIG. 29 illustrates a general block diagram of a histogram array 200. The histogram array 200 is populated with a set of numbers which corresponds to the color info of the tile under evaluation in the Modified A*Heuristic Search. The histogram array 200 contains values for Y (brightness or Luma) 202, Cr (red) 204 and Cb (blue) 206 and a plurality of common Hues 208.

In the exemplary embodiment, the histogram array 200 has a first set of first values (e.g. 28 values) corresponding to the Luma data (Y) 202 in the tile; a second set of values (e.g. 28 values) corresponding to the Cb (how much blue) 206 in the tile; and a third set of values (e.g. 28 values) corresponding to the Cr (how much red) 204 in the tile. The Y, Cr and Cb values 202, 204 and 206 have a range of 0 to 255 which are scaled (e.g. by a scale factor of 3). More specifically, the histogram array 200 is populated with data corresponding to how many pixels in the tile have a Y, Cr and Cb of from 0-255.

In the exemplary embodiment, there are fifteen (15) Hue values 208 populated in the histogram array 200. The Hues 208 may include red, green, blue, cyan, yellow, magenta, . . . , black, gray and white in the HSV-like space. HSV-like space corresponds to the hue 208A, saturation 208B and value 208C of the pixel.

The Hue values 208 are computed for every pixel, the hue value being a color of a pixel. For example, red, pink, and dark red are the same hues of red. Green, dark and light green are hues of green.

The Hue values 208 indicate whether a tile has any red in it and does not care about lighting. Thus, by adding Hue to the histogram function calculation, any variation due to lighting are essentially removed. More specifically, by adding the Hue values to the histogram function calculation eliminates the fact that tile t and tile $t_{goal}$ may be slightly different due to lighting.

Thus, before computing the cost function f(t) of equation Eq.(1), the histogram array 200 for the tile $t_{goal}$ and the tile "t" under evaluation during the Modified A*Heuristic Search is computed. Then, the two histogram arrays for $t_{goal}$ and the tile "t" can be simply subtracted. The histogram array allows the pixels to be identified in terms of a given Y, given Cb and given Cr (e.g., if the image is black, the Y is zero, so all 128×128 pixels have a Y of zero). Thus, the histogram is arranged to show a spike in the histogram. The spike caused by slight lighting differences causes histogram peaks to misalign throwing a great match way off. Hence, each pixel is given Y, Cr and Cb values 202, 204 and 206.

In addition to the Y, Cr and Cb values 202, 204 and 206, three (3) new numbers from the Y, Cr, Cb are computed. These new numbers include the hue 208A, saturation 208B and value 208C of the pixel. The HSV is a different way of evaluating the color of a pixel. Thus, the histogram function $wh_{all}$*histogramDiff$_{all}$(t,tgoal) is defined by equation Eq.(2)

$$w_{all} * \text{histogramDiff}_{all}(t, t\text{goal}) = wY * \text{histogram}Y\text{Diff}_{all}(t, t\text{goal}) + wCb * \text{histogram}Cb\text{Diff}_{all}(t, t\text{goal}) + wCr * \text{histogram}Cr\text{Diff}_{all}(t, t\text{goal}) + w\text{Hue} * \text{histogramHueDiff}_{all}(t, t\text{goal}) \quad \text{Eq.(2)}$$

where the $wh_{all}$ is the sum of wY+wCb+wCr+wHue which is between 0 and 1. These four (4) histogram sub-functions also allow an individual weight to be applied, programmed and set individually.

As can be readily seen, the Modified A*Heuristic Search uses circular tiles instead of square tile. The combination of Hue/Histogram/SAD for use in finding a perfect or ideal stitching tile $t_{endPos}$ (FIG. 26C) or its circular counterpart $ct_{endPos}$ reduces the effect of lighting variation between two images.

The above provides good rotation-independent heuristic, but limited hues do not provide enough precision when doing pixel-wide searches.

Figure 12:
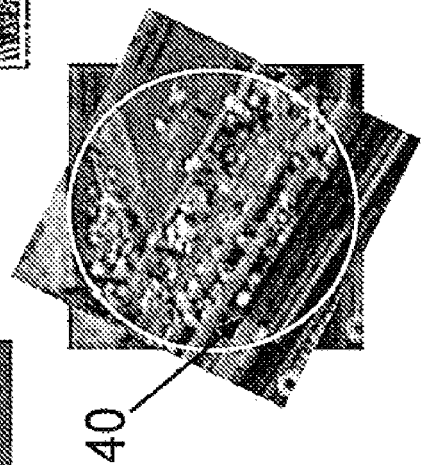
FIG. 12 illustrates two overlaid square tiles which are offset or rotated with respect to the other.

FIG. 12 illustrates two overlaid square tiles which are offset or rotated with respect to the other. The top square tile is from the left photographic image L and the bottom square tile is from the right photographic image R. The overlaid perspective demonstrates the rotational offset between the tile of with the circular footprint 40 representing $t_{goal}$ in the left image, and a similar or identical tile in the right image. Because, the Modified A*Heuristic Search looks at the circular center of the two tiles, generally, the same number of colors (i.e. hue, saturation, value) regardless of the fact that the two tiles are rotationally offset are found. Thus, rotationally offset is not a factor when counting the number of pixels of a certain color for two essentially identical tiles.

Figure 13:
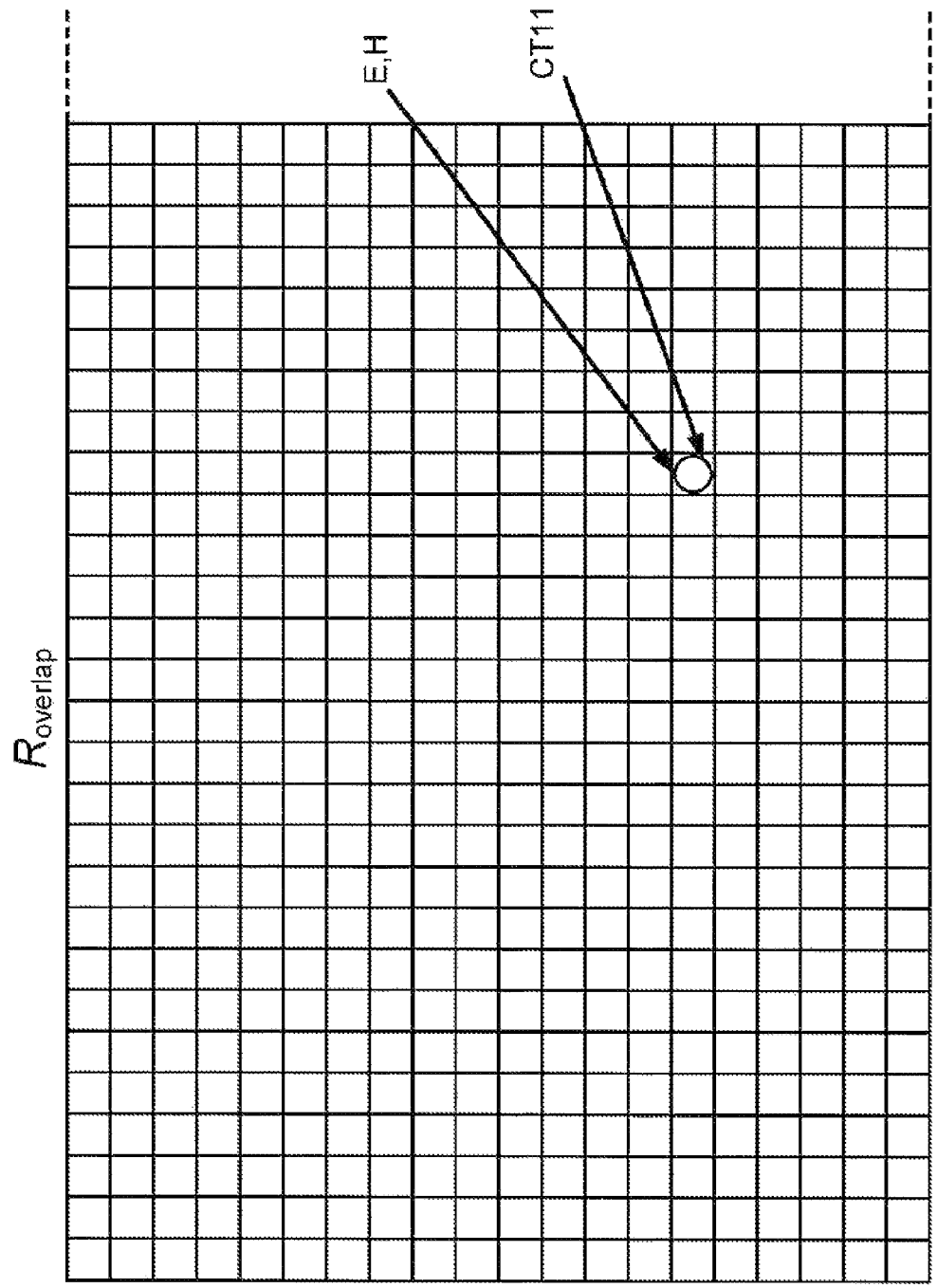
FIG. 13 illustrates the array of $R_{overlap}$ with a starting point indicated to begin a Modified A*Heuristic Search.

FIG. 13 illustrates the array of $R_{overlap}$ with a starting point indicated to begin a Modified A*Heuristic Search. The process of the Modified A*Heuristic Search will now be described in detail in relation to FIGS. 13-21. The search begins exploring neighboring tiles (set of candidate tiles) from the tile $t_{start}$ or its circular counterpart $ct_{start}$ at a predetermined first radius. The explored tiles are ranked to find a lowest cost on the horizon (H) tile and the lowest cost ever found (LCEF) tile. The process of the Modified A*Heuristic Search keeps track of the H tiles and the LCEF tiles, denoted as E tiles. In some instances the H tile and the E tile may be the same. However, using an artificial intelligence-like process, the Modified A*Heuristic Search explores additional candidate tiles in a new set using the same predetermined first radius from a current lowest cost on the horizon (H) tile to update the H tile for the new set and tracks a current LCEF tile for all candidate tiles explored thus far. The exploring continues at the predetermined first radius until the cost associated with any current H tile is greater than the cost associated with the current LCEF tile (tile E) multiplied by an OVERSHOOT value. When the current H tile is determined to be greater, the Modified A*Heuristic Search returns to the LCEF tile (tile E) and reduces the size of the radius. The Modified A*Heuristic Search then explores those neighboring (candidate tiles) in $R_{overlap}$ from the current LCEF tile (tile E) at the reduced radius from the current LCEF tile. The search continues in a similar manner until the radius equal 0 (meaning there is only 1 pixel in any direction). When the radius is less than 1, subtiling exploration or sampling takes place, as best seen in FIG. 21, such that the cost function is evaluated based on pixels instead of tiles, because the circular tiles begin to overlap.

For illustrative purposes, assume that the average photograph is 3 mega-pixels (i.e. 2048×1536). The 20×28 boxes in FIGS. 13-21 are only provided to cover an area sufficient to demonstrate the Modified A*Heuristic Search. As can be appreciated an area 2048×1536 is prohibitive. The dashed lines on the right of the $R_{overlap}$ denote that the area continues.

The OVERSHOOT can be best described as how much greater than the LCEF tile should exploration continue before the exploration has gone too far to produce better results. For example, the OVERSHOOT may be set to 10%. Thus, the OVERSHOOT value would be 110%. OVERSHOOT is a number that is programmable.

In FIG. 13, the area $R_{overlap}$ is shown with a solid-line circle within a square denoted as CT11. The circle CT11 is $ct_{start}$ of FIG. 11B determined to be the ideal starting spot in the area $R_{overlap}$ to initiate the Modified A*Heuristic Search. The circular tile, denoted as $ct_{start}$, is shown within a corresponding square in the area $R_{overlap}$. The square tiles the area $R_{overlap}$ are 128×128 corresponding to a tile's width and the height (Twidth×Theight). In FIG. 13 the starting circular tile $ct_{start}$ is also marked as the E tile and the H tile. The solid line of the starting circular tile $ct_{start}$ indicates that the tile is newly opened.

Each tile has 128×128 pixels which are distributed over the "square area" or square shape of each tile. The right photographic image R will be rotated by a calculated amount. Therefore, the square shape of each tile is changed to a circular shape. Only those pixels within the circular shape or footprint defining the circular tile are evaluated. Hence, those pixels corresponding to the corners of a square tile are omitted. Likewise, $t_{goal}$ is 128×128 and $ct_{goal}$ is the circular footprint used for evaluation of the tile $t_{goal}$.

Figure 14:
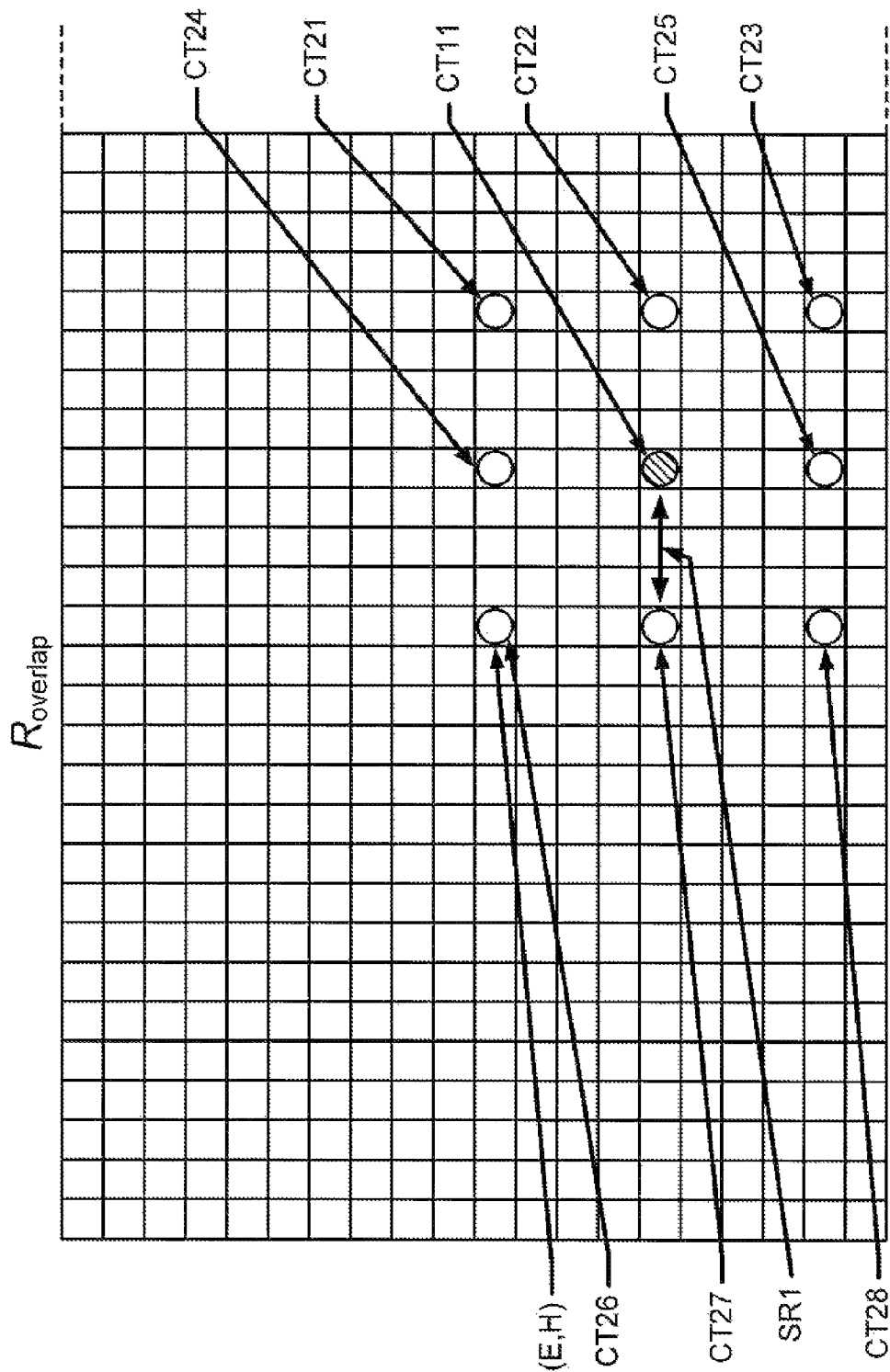
FIG. 14 illustrates the array of $R_{overlap}$ of FIG. 13 with a search using a first radius in the Modified A*Heuristic Search.

FIG. 14 illustrates the array of $R_{overlap}$ of FIG. 13 with a search using a first radius in the Modified A*Heuristic Search. In FIG. 14, the neighbors with a (first) radius SR1 are shown. Here the radius SR1 is 4. The neighbors create a plurality of candidate tiles to be evaluated during the first stage of the Modified A*Heuristic Search. The plurality of candidate tiles (8 neighbors) are labeled CT21, CT22, CT23, CT24, CT25, CT26, CT27 and CT28. The solid lines of these circles indicate the tiles are newly opened. After the search is completed, the starting circular tile $ct_{start}$ (CT11) is closed, as represented by the hatched circle (with diagonal lines) and a new tile (tile CT26) is labeled as both tile E and tile H (meaning found to be both the LCEF and the lowest cost on the horizon).

In the Modified A*Heuristic Search, when examining all neighbors of the tiles explored so far, the tiles are arranged in a lowest-cost order (via a sorted OPEN circular tile list) to prevent cycles (via a CLOSED tile list).

Figure 15:
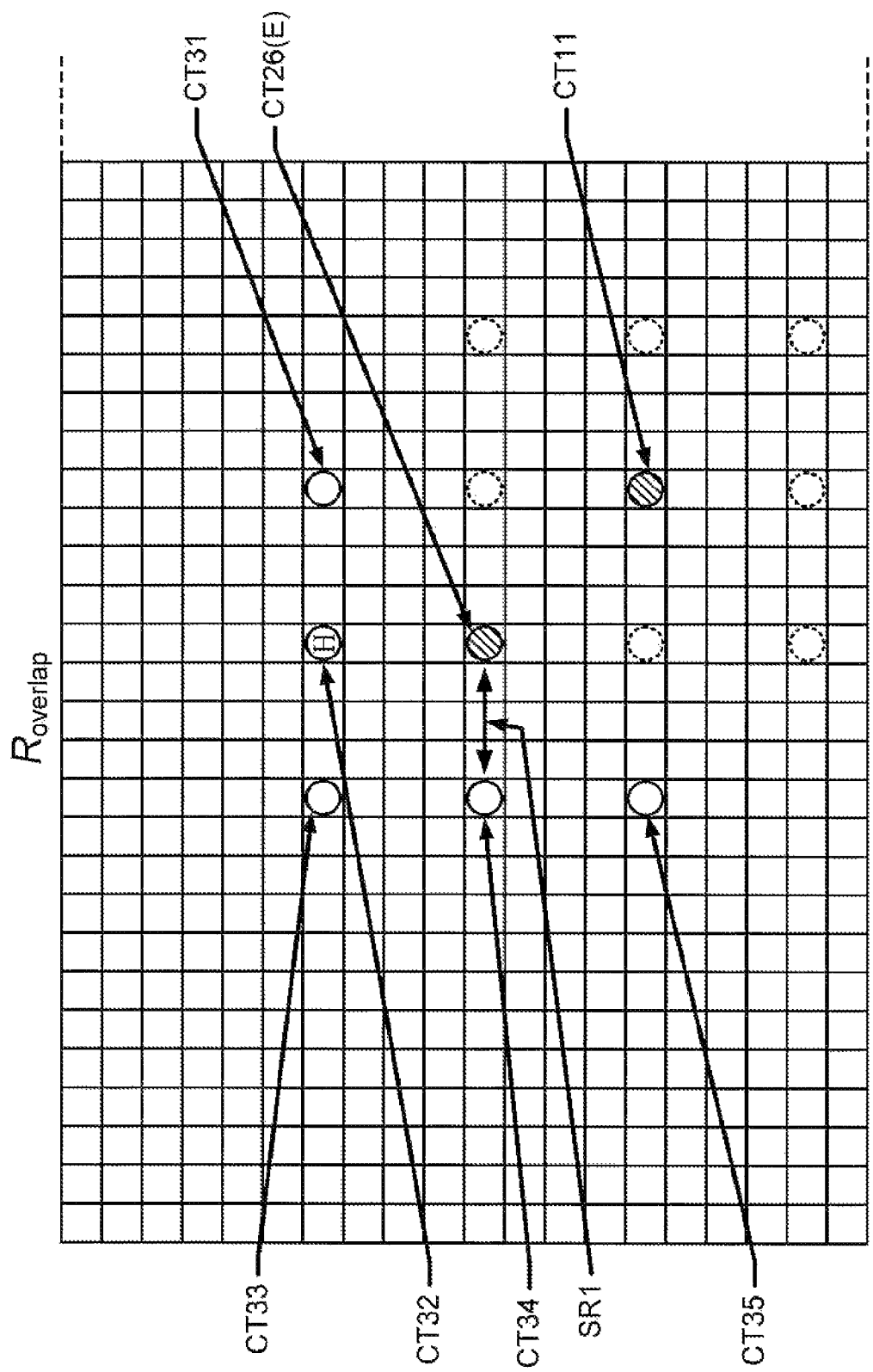
FIG. 15 illustrates the array of $R_{overlap}$ of FIG. 14 with an extension of the search using the first radius in the Modified A*Heuristic Search.

FIG. 15 illustrates the array of $R_{overlap}$ of FIG. 14 with an extension of the search using the first radius in the Modified A*Heuristic Search. In FIG. 15, the Modified A*Heuristic Search is continued or extended to explore additional candidate tiles with the radius SR1 beginning from the tile labeled CT26 because the tile CT26 is the lowest cost on the horizon (H) tile. Here there are 8 neighbors. However, the newly opened neighbors are labeled CT31, CT32, CT33, CT34, CT35, and shown with a solid circle line. Those neighbors which were previously opened in FIG. 14 are shown as a dotted circle line and correspond to candidate tiles CT21, CT22, CT23, CT24, CT25, CT27 and CT28. The tile CT32 is determined to be the lowest cost on the horizon (H) tile. The tile CT11 has been closed. The tile CT26 is closed and remains the LCEF tile labeled E. At this level of exploration, only the cost for the newly opened neighbors CT31, CT32, CT33, CT34, CT35 needs to be computed, because the cost for the previously opened tiles in FIG. 14 does not change.

Figure 16:
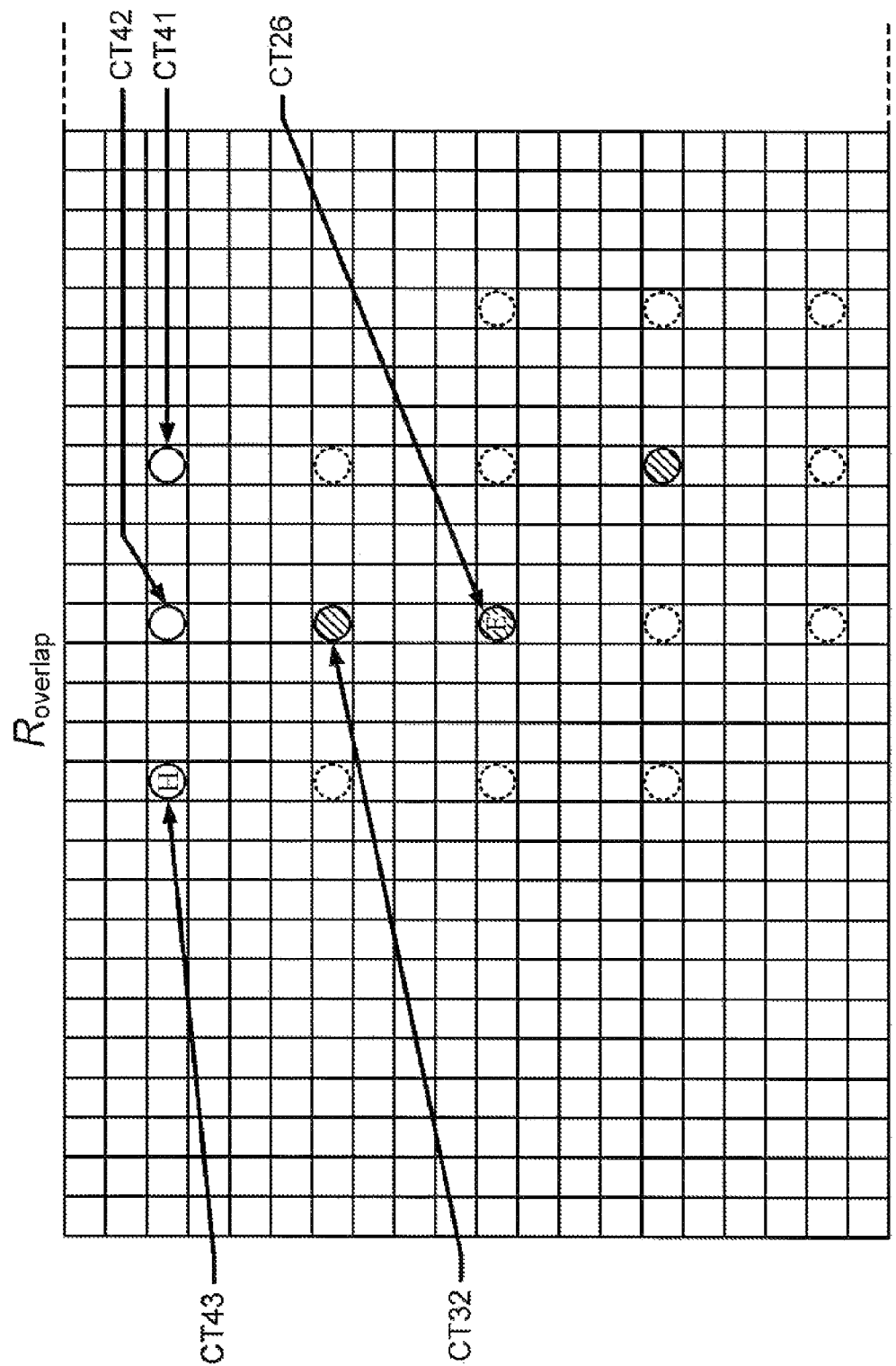
FIG. 16 illustrates the array of $R_{overlap}$ of FIG. 15 with a further extension of the search using the first radius which exceeds the OVERSHOOT threshold in the Modified A*Heuristic Search.

FIG. 16 illustrates the array of $R_{overlap}$ of FIG. 15 with a further extension of the search using the first radius which exceeds the OVERSHOOT threshold in the Modified A*Heuristic Search. In FIG. 16, the exploration continues where a new candidate list of tiles is determined having the first radius from the new H tile CT32. Here, there are 8 candidates from the new H tile CT32, but only 3 are new candidate tiles, labeled CT41, CT42 and CT43, and shown in a solid dotted line. All other previously opened tiles are shown in dotted lines. The LCEF tile (tile E) remains tile CT26. The candidate tile CT43 is determined to be the lowest cost on the horizon (H) tile and the tile CT32 is closed (represented by the hatched circle). When evaluating for the OVERSHOOT, it is determined that the H tile CT43 has a cost that is greater than the cost associated with the current LCEF tile (tile E) multiplied by the OVERSHOOT value. Hence, the Modified A*Heuristic Search returns to the current LCEF tile (tile E) and the radius is reduced by a predetermined factor (e.g. a factor of 0.5). The current LCEF tile (tile E) is also closed.

Figure 17:
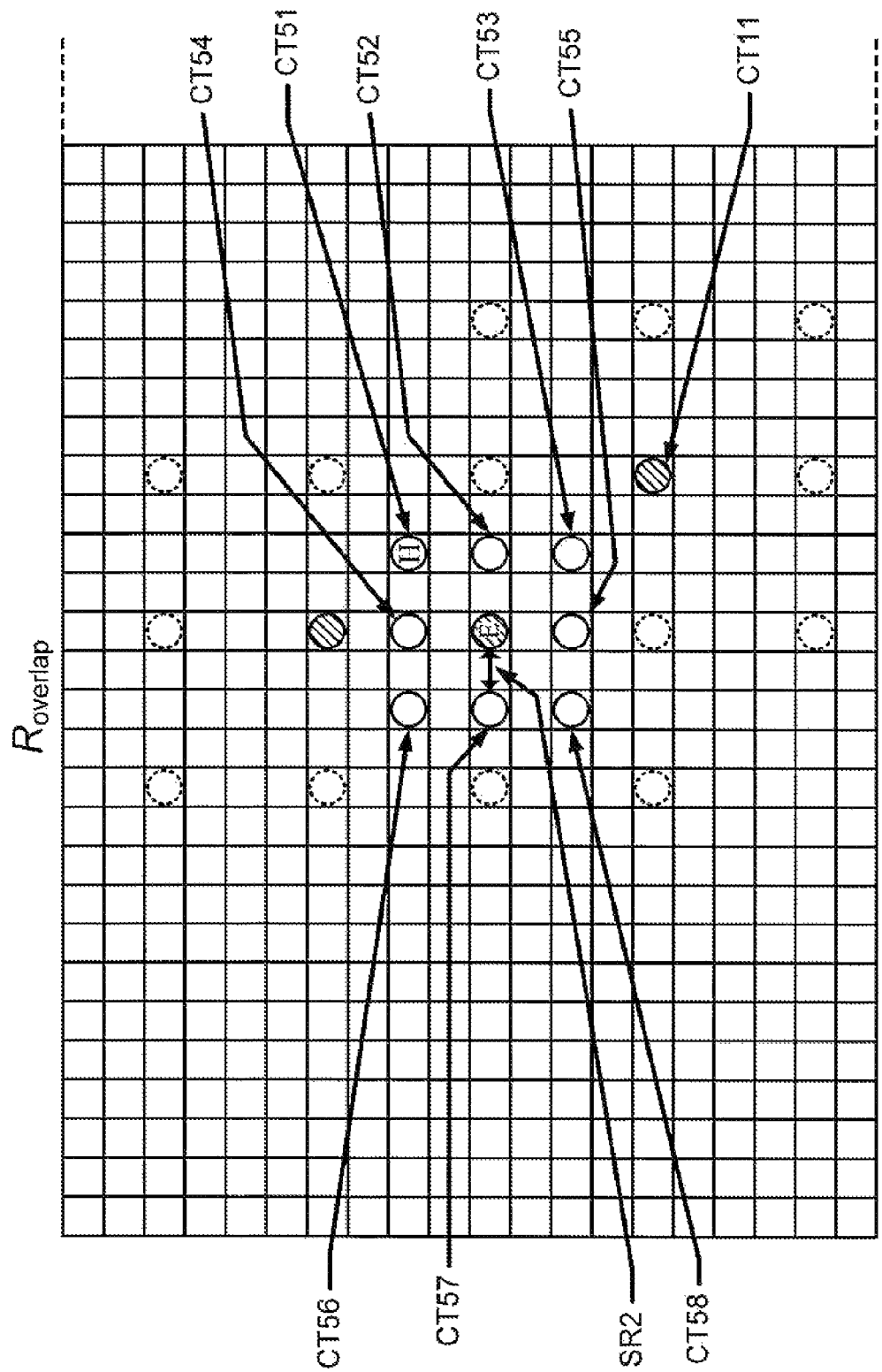
FIG. 17 illustrates the array of $R_{overlap}$ of FIG. 16 with a second search using a second radius in the Modified A*Heuristic Search.

FIG. 17 illustrates the array of $R_{overlap}$ of FIG. 16 with a second search using a second radius in the Modified A*Heuristic Search. In FIG. 17, the Modified A*Heuristic Search finds a new set of candidate tiles from the current LCEF tile (tile E) at the reduced current radius SR2 (e.g. radius of 2). The new set of candidate tiles are newly opened and shown in solid lines. This new set of candidate tiles are labeled CT51, CT52, CT53, CT54, CT55, CT56, CT57 and CT58. The cost associated with these candidate tiles is computed. The tile CT51 is determined to be the lowest cost on the horizon (H) tile. However, when evaluating for the OVERSHOOT, it is determined that the H tile CT51 has a cost that is greater than the cost associated with the current LCEF tile multiplied by the OVERSHOOT value. Hence, the Modified A*Heuristic Search returns to the current LCEF tile (tile E) and the current radius further reduced by a predetermined factor (e.g. a factor of 0.5).

Figure 18:
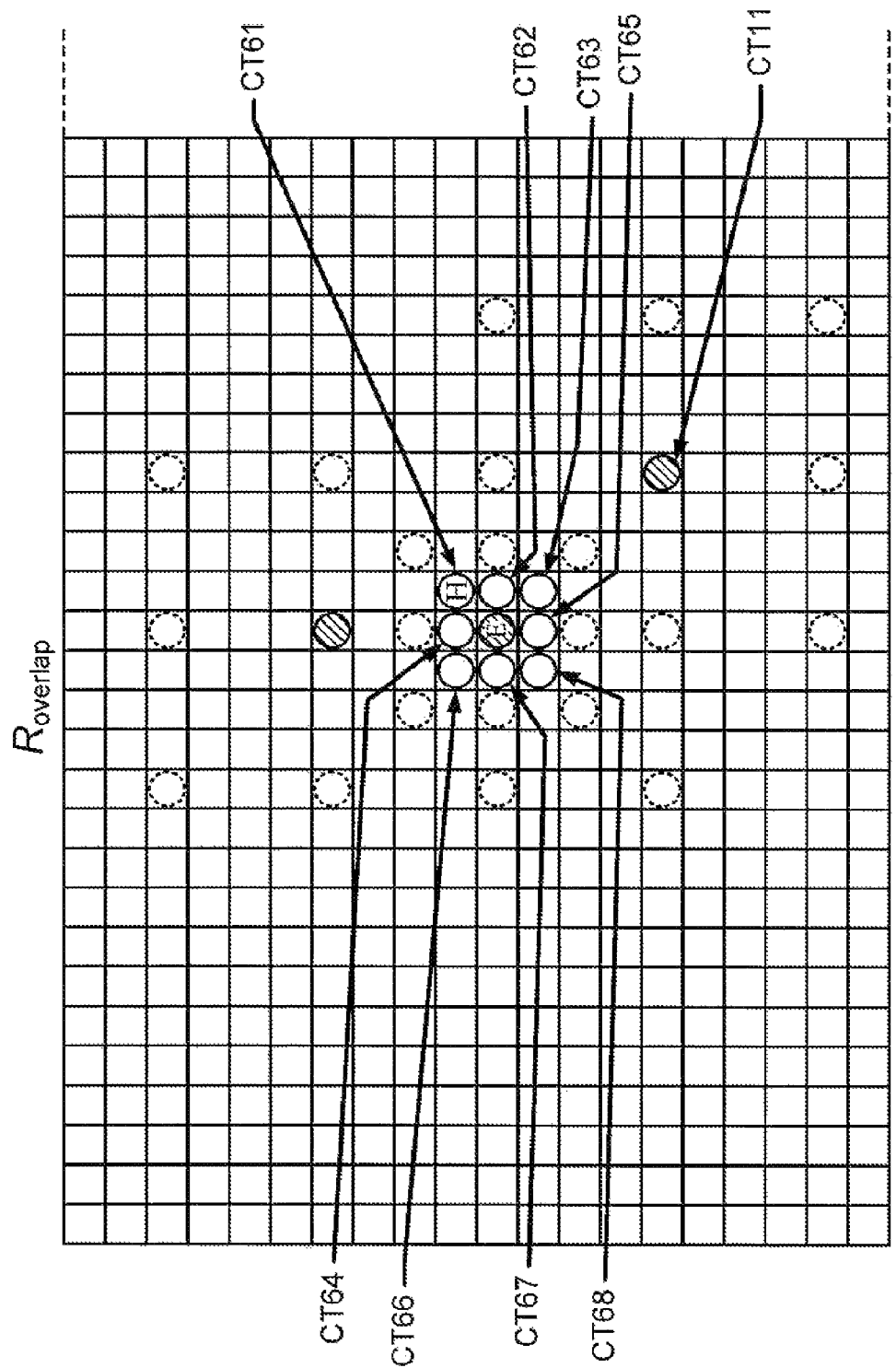
FIG. 18 illustrates the array of $R_{overlap}$ of FIG. 17 with a third search using a third radius in the Modified A*Heuristic Search.

FIG. 18 illustrates the array of $R_{overlap}$ of FIG. 17 with a third search using a third radius in the Modified A*Heuristic Search. In FIG. 18, the Modified A* Heuristic Search finds a new set of candidate tiles from the current LCEF tile (tile E) at the reduced current radius (e.g. radius of 1). The new set of candidate tiles are newly opened and shown in solid lines. This new set of candidate tiles are labeled CT61, CT62, CT63, CT64, CT65, CT66, CT67 and CT68. The cost associated with each of these candidate tiles is computed. The tile CT61 is determined to be the lowest cost on the horizon (H) tile.

Figure 19:
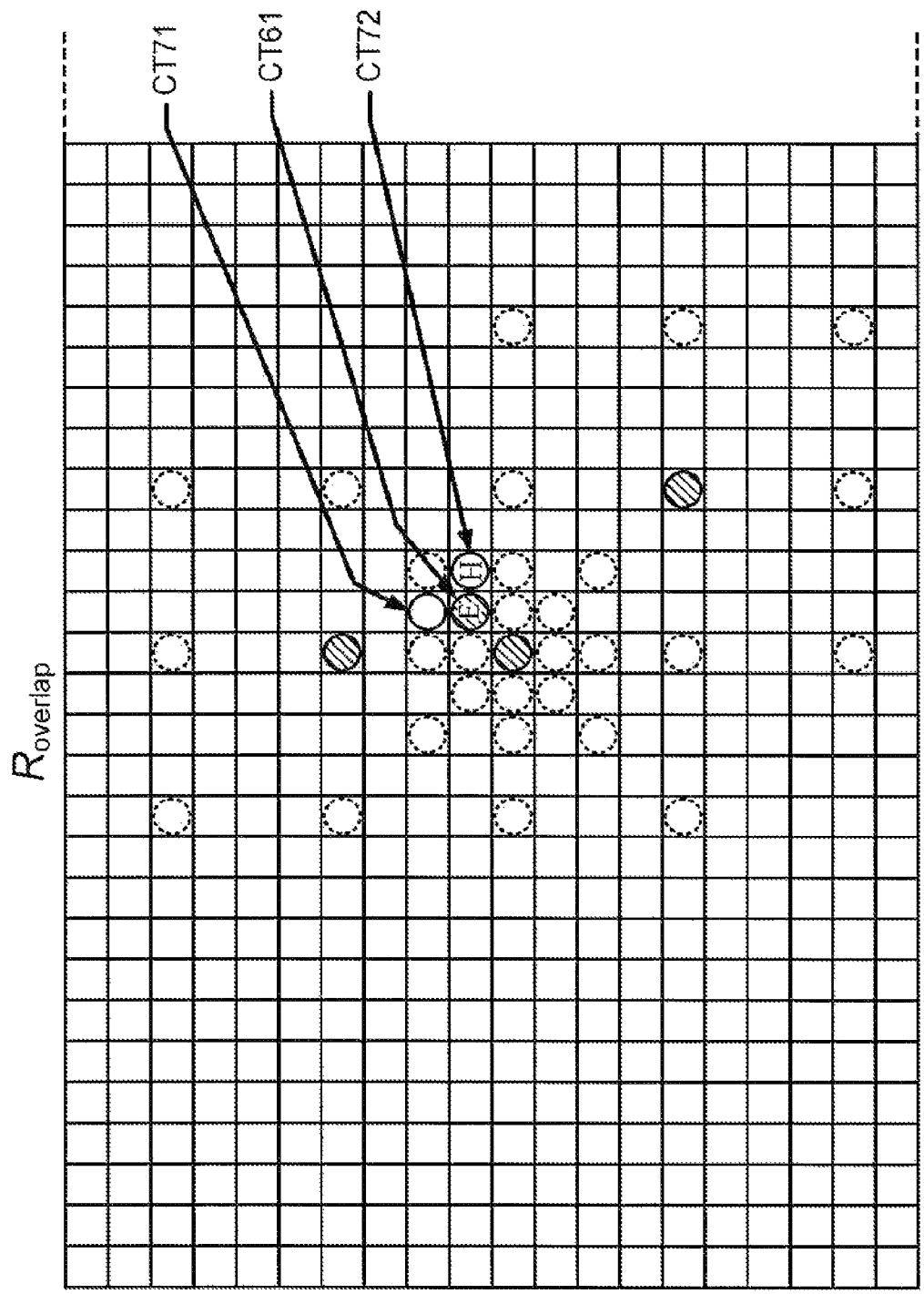
FIG. 19 illustrates the array of $R_{overlap}$ of FIG. 18 with an extension of the search using the third radius in the Modified A*Heuristic Search.

FIG. 19 illustrates the array of $R_{overlap}$ of FIG. 18 with an extension of the search using the third radius in the Modified A*Heuristic Search. In FIG. 19, after evaluating this new set of candidate tiles CT61, CT62, CT63, CT64, CT65, CT66, CT67 and CT68, the H tile CT61 is determined to be the new LCEF tile (tile E). Hence, the previous LCEF tile, because closed and no longer the current LCEF tile, is shown as a hatched circle, but the "E" has been removed. Again, a new set of candidate tiles at the current radius are determined to be candidate tiles CT71 and CT72. Here, the lowest cost on the horizon (H) tile is tile CT72. However, when tracking the current LCEF tile (tile E), the new current LCEF tile is determined to also be the tile CT72. Hence, a new set of candidate tiles CT81, CT82 and CT83 from the H tile CT72 are determined in FIG. 20.

Figure 20:
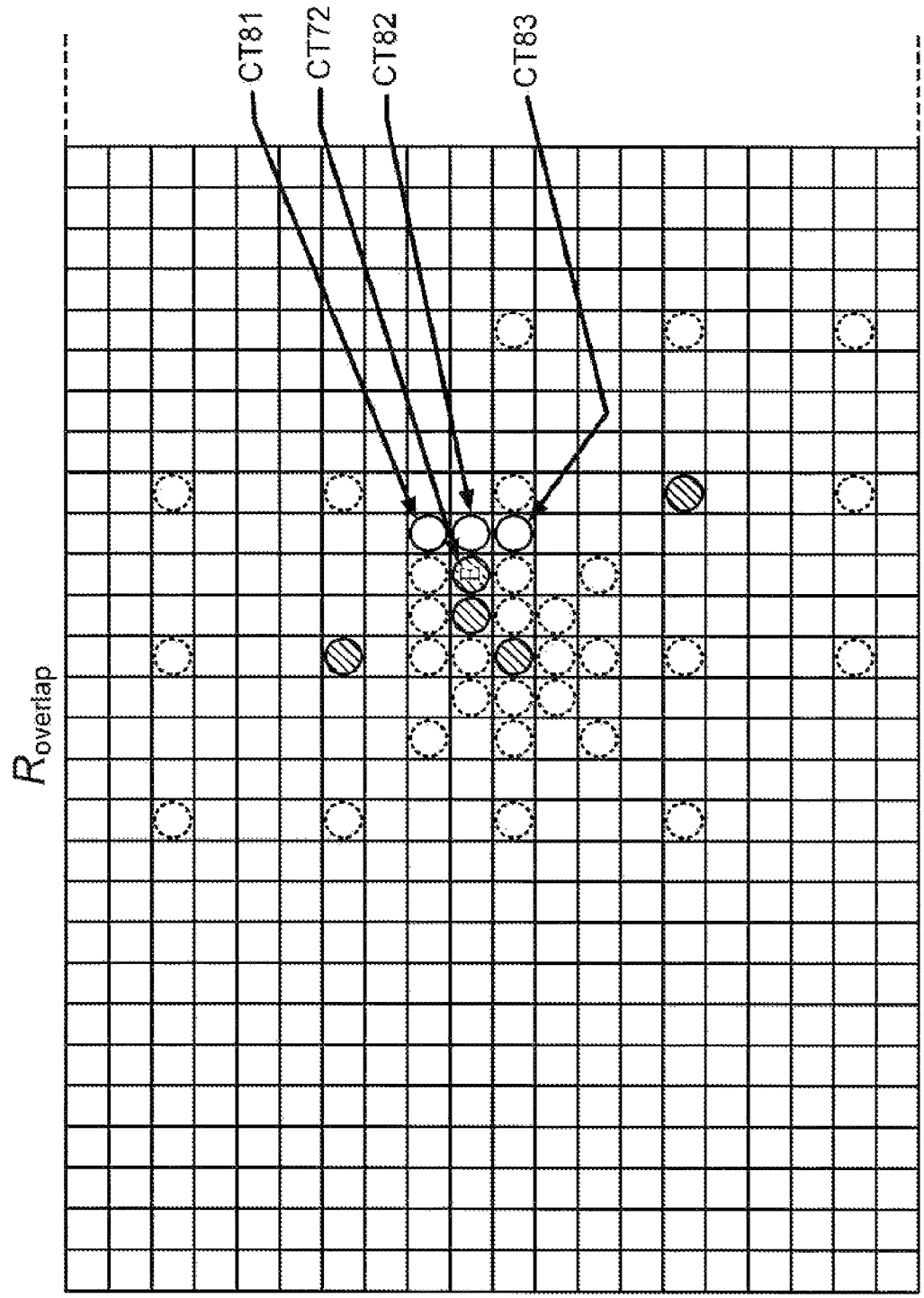
FIG. 20 illustrates the array of $R_{overlap}$ of FIG. 19 with a further extension of the search using the third radius in the Modified A*Heuristic Search.
Figure 21:
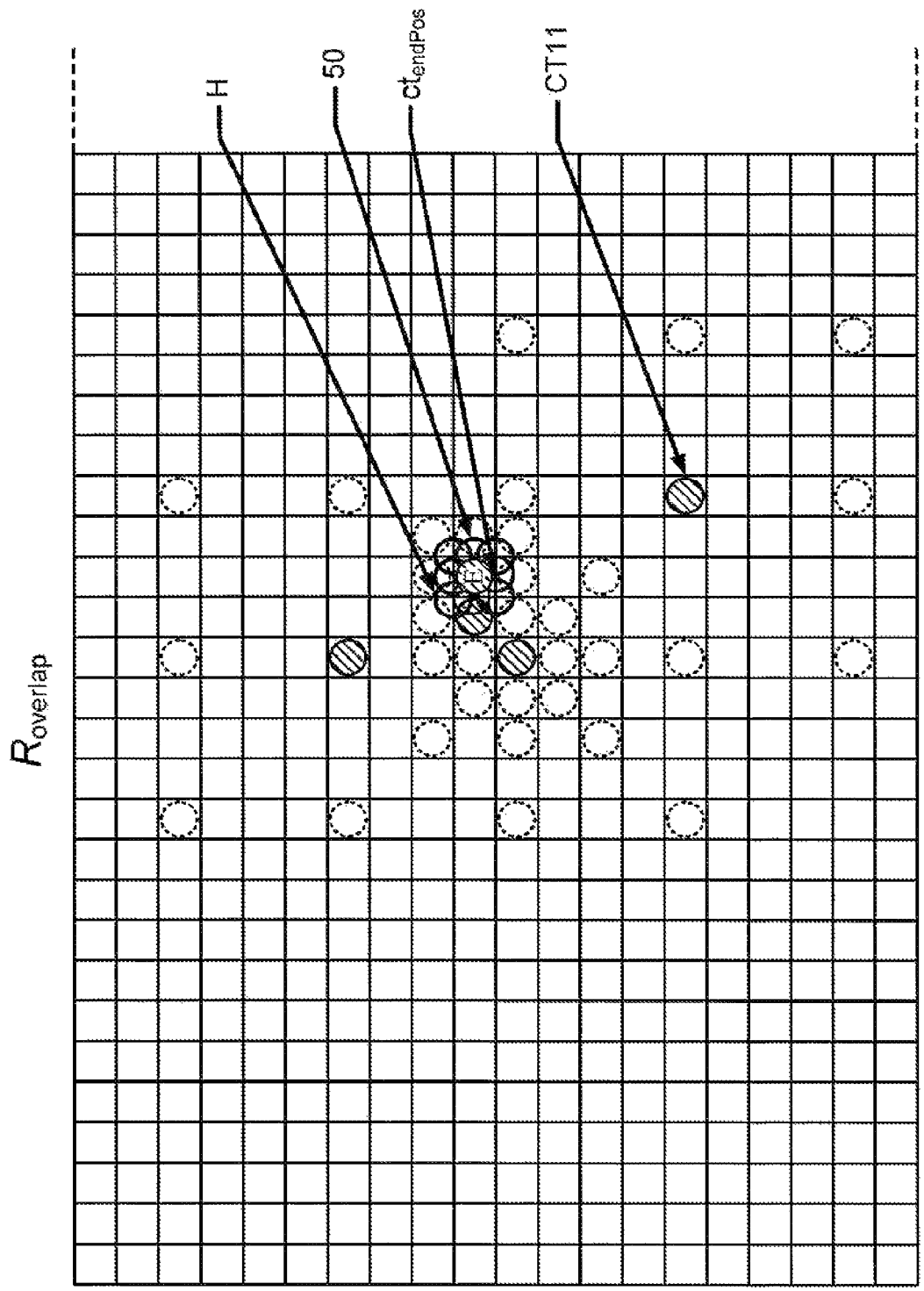
FIG. 21 illustrates the array of $R_{overlap}$ of FIG. 20 with a fourth search using sub-tiling searching in the Modified A*Heuristic Search.

FIG. 20 illustrates the array of $R_{overlap}$ of FIG. 19 with a further extension of the search using the third radius in the Modified A*Heuristic Search. In FIG. 20 the OVERSHOOT is evaluated using the new tiles CT81, CT82 and CT83 but, when evaluating for the OVERSHOOT, it is determined that the H tile is greater than the cost associated with the current LCEF tile multiplied by the OVERSHOOT value. Hence, the Modified A*Heuristic Search returns to the current LCEF tile (tile E) CT72 and the current radius is further reduced by a predetermined factor (e.g. a factor of 0.5). However, the radius is now less than one. Hence subtiling exploration begins, as shown in FIG. 21.

FIG. 21 illustrates the array of $R_{overlap}$ of FIG. 20 with a fourth search using sub-tiling searching in the Modified A*Heuristic Search. In FIG. 21, the subtiling exploration is shown as overlapping circular tiles 50. The current and final LCEF tile (tile E) is CT72 and is labeled $ct_{endPos}$ in FIG. 11B. In FIG. 11B, the white circles correspond to at least the overlapping circular tiles 50 in FIG. 21. The current and final LCEF tile (tile E) is the perfect or ideal stitching spot to stitch the left photographic image to the right photographic image. As can be appreciated, the subtiling exploration would continue in a manner similar to that previously described for full circular tiles. The new H tile is a subtile in the top left corner from the current E tile and would be evaluated the same for the OVERSHOOT.

During the subtiling exploration, overlapping candidate tiles in the area $R_{overlap}$ are compared with the circular tile $ct_{goal}$, on a pixel basis. The radius can be further reduced on a pixel basis until there is only one pixel left. However, it may be determined that shifting by one pixel, left, down, up, right, would not yield a better LCEF tile, at which time the search stops.

Figure 22:
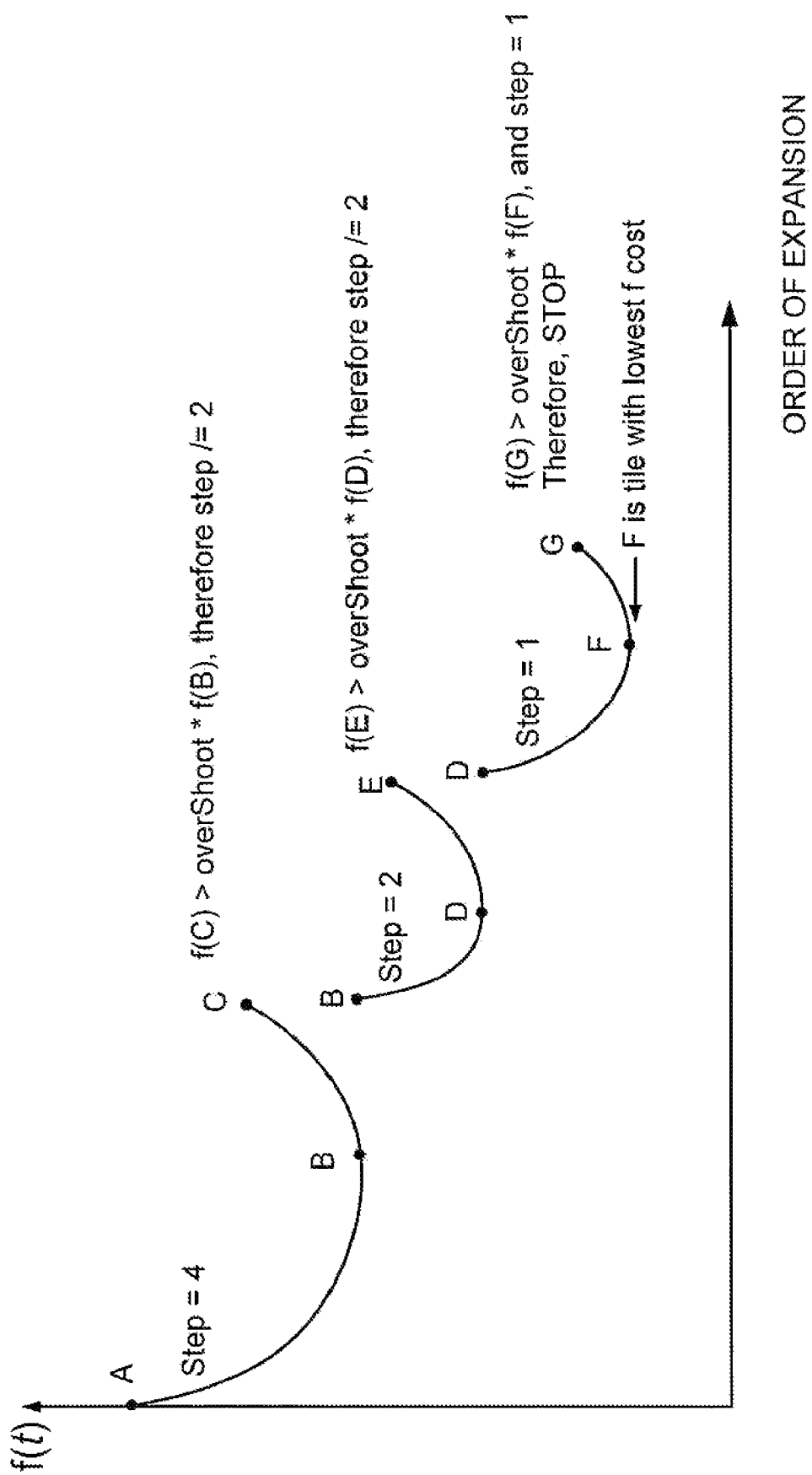
FIG. 22 illustrates the graph of the cost function f(t) versus the order of expansion in the search using the Modified A*Heuristic Search.

FIG. 22 illustrates the graph of the cost function f(t) versus the order of expansion in the search using the Modified A*Heuristic Search. A summary of the Modified A*Heuristic Search will now be described in relation to the graph shown in FIG. 22. The cost function f(t) is calculated for the tiles A, B and C, denoted as points on a curve, with a first radius (e.g. radius of 4) and any other neighbors (candidate tiles) that fall in the curve with the points A, B and C. The evaluation of the cost function for other tiles is stopped because the cost function f(C) is greater than OVERSHOOT*f(B) where f(B) is the cost associated with the current LCEF tile. Hence, the search using the first radius is stopped. The radius is reduced in half and the Modified A*Heuristic Search continues.

Using the reduced radius (e.g. radius of 2), the cost function f(t) is calculated for the tiles B, D and E, denoted as points on a curve, and any other opened neighbors (candidate tiles) that fall in the curve with the points B, D and E. The evaluation of the cost function for other tiles is stopped because the cost function f(E) is greater than OVERSHOOT*f(D) where f(D) is the cost associated with the current the LCEF tile. Hence, the search using the second radius is stopped. The second radius is reduced in half and the Modified A*Heuristic Search continues.

Using the reduced radius (e.g. radius of 1), the cost function f(t) is calculated for the tiles D, F and G, denoted as point on a curve, and any other opened neighbors (candidate tiles) that fall in the curve with the points D, F and G. The evaluation of the cost function for other tiles is stopped because the cost function f(G) is greater than OVERSHOOT*f(F) where f(F) is the cost associated with the current LCEF tile. The tile F has the lowest cost.

Figure 23B:
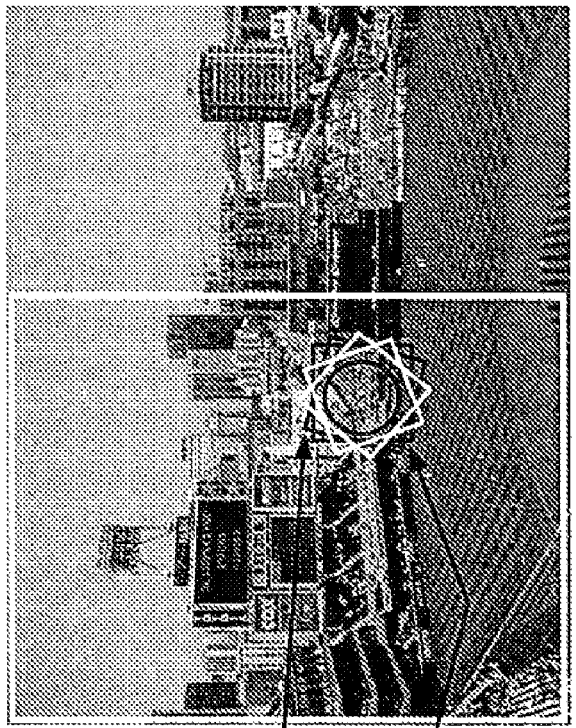
FIGS. 23A and 23B illustrate the left and right photographic images of FIGS. 1A and 1B with $t_{goal}$, $t_{endPos}$ and $t_{endRot}$ designated.
Figure 23A:
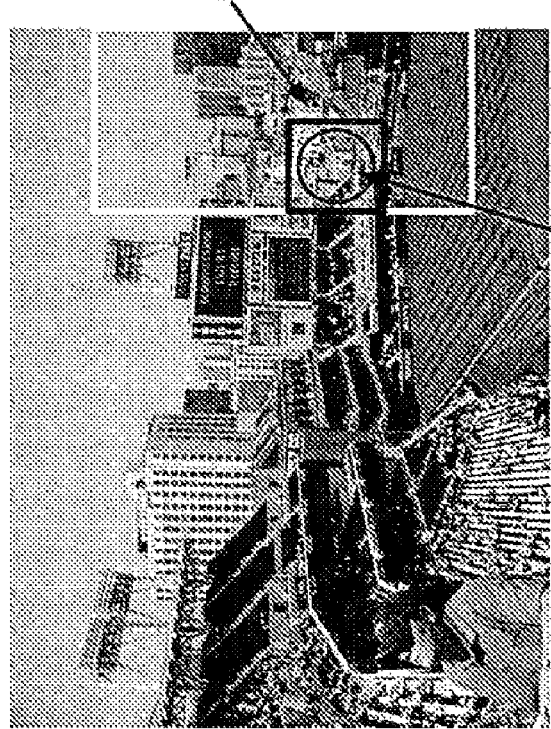
Figure 24:
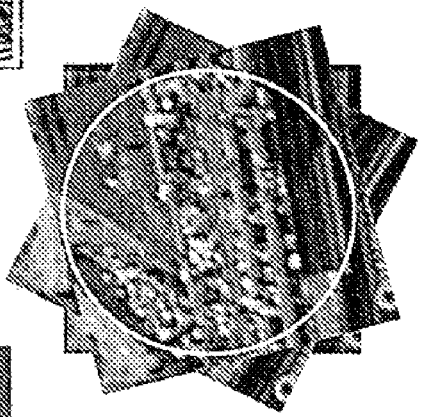
FIG. 24 illustrates overlaid tiles of $t_{endPos}$ of FIG. 23B at multiple rotations.

FIGS. 23A and 23B illustrate the left and right photographic images of FIGS. 1A and 1B with $t_{goal}$, $t_{endPos}$ and $t_{endRot}$ designated. FIG. 24 illustrates overlaid tiles of $t_{endPos}$ of FIG. 23B at multiple rotations. In FIGS. 23A, 23B and 24, the tiles $t_{goal}$, $t_{endRot}$, and $t_{endPos}$ are shown as a square tile with a circular tile counterpart.

Figure 27:
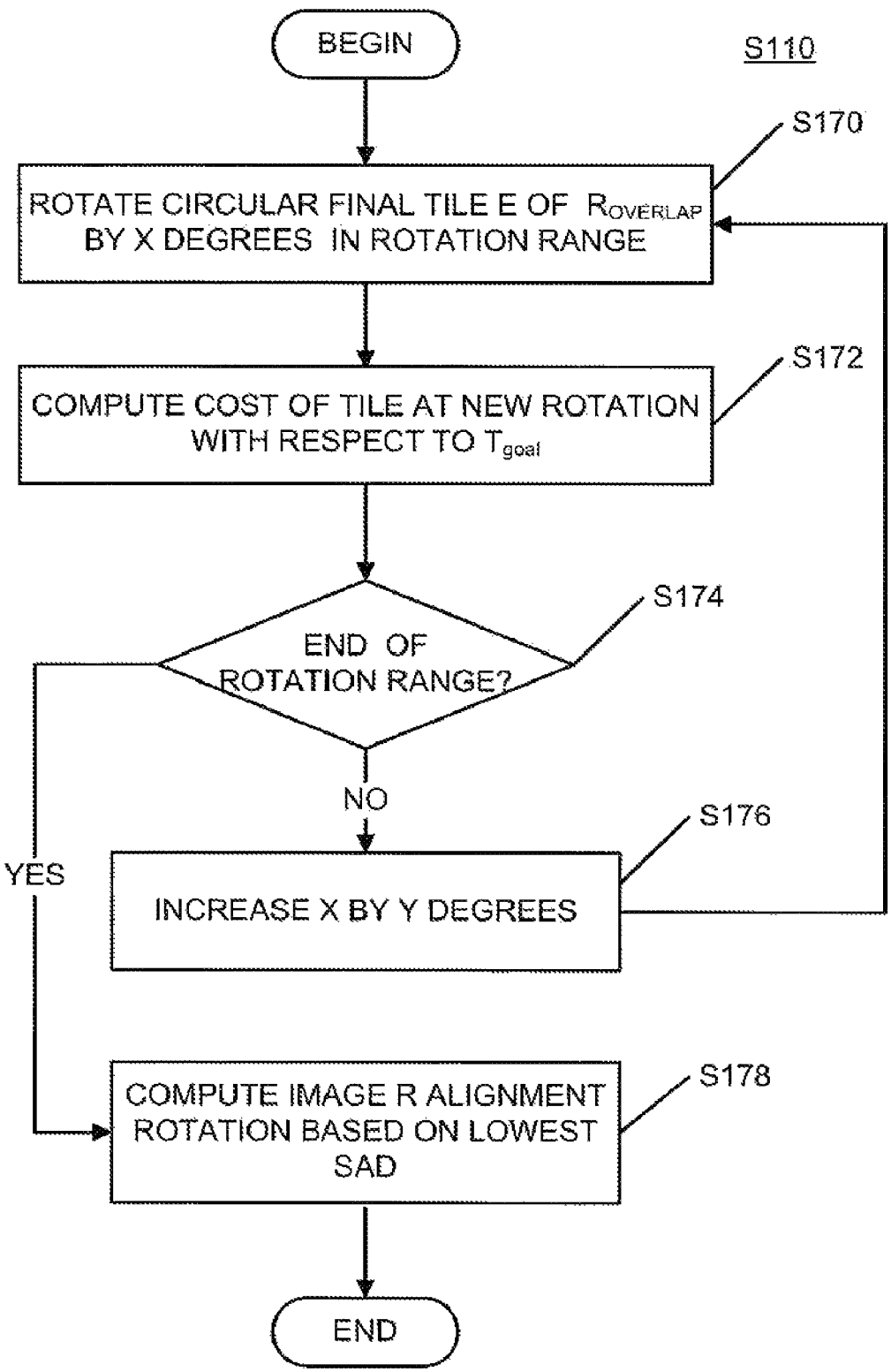
FIG. 27 illustrates a flowchart of the process for computing the alignment rotation for the right photographic image.

FIG. 27 illustrates a flowchart of the process for computing the alignment rotation the alignment rotation at step S110 (FIG. 6A) in the right image R. Beginning with the ideal stitching spot or tile, denoted as $t_{endPos}$, the circular tile is rotated a predetermined amount at step S170 and a cost using a SAD-only function with the circular tile for tile $t_{goal}$ is calculated at step S172. Step S172 is followed by step S174 where a determination is made whether an end of the rotation range is reached. If the determination is "NO," then step S174 is followed by step S176 where the rotation (in degrees) is increased by a predetermined amount. Step S176 loops back to step S170. However, if the determination at step S174 is "YES," then step S174 is followed by step S178. At step S178, the alignment rotation for the image R is computed. For example, the rotation (in degrees) associated with the lowest SAD may be determined to be the alignment rotation. So that the ideal stitching spot or tile, denoted as $t_{endPos}$ in the area $R_{overlap}$ best matches the tile $t_{goal}$, the alignment rotation process when calculating the SAD uses the circular tile format to eliminate the corners in the SAD calculations.

Figure 26D:
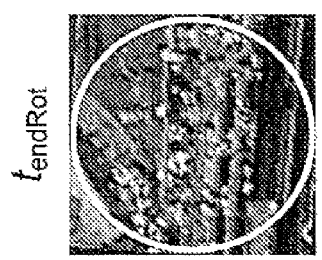
FIG. 26D illustrates the $t_{endRot}$ tile.
Figure 26C:
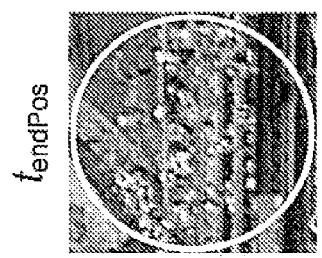
FIG. 26C illustrates the $t_{endPos}$ tile.
Figure 26B:
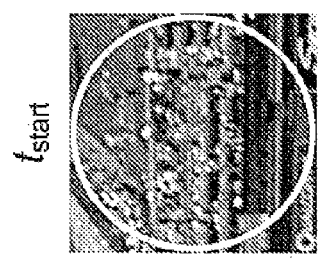
FIG. 26B illustrates the $t_{start}$ tile.

In the exemplary embodiment, the circular tile $ct_{endPos}$ is rotated in the range from −10 degrees to 10 degrees with 21 different rotations. Hence, the increment used in this embodiment is 1°. However, other increments may be used. FIG. 24 illustrates tile $t_{goal}$ overlaid over rotated tiles (shown in white) of FIG. 23B at different degrees. The final rotation of the tile $t_{endPos}$ (shown in black) is labeled $t_{endRot}$ (also shown in black). In this embodiment, the alignment rotation is determined to be 7 degrees. This compensates or corrects for any rotational differences between the left and right images. The tile $t_{endRot}$ is also shown in FIG. 26D.

As previously described, if the rotation alignment is less than 3°, then the tile $t_{endPos}$ is the final tile and can be set as the tile $t_{match}$ (FIG. 26E), described below. Thereafter, the stitching process can immediately begin if the best matching tile is tile $t_{endPos}$ which saves those additional computations associated with the rotation alignment process. When stitching, the left image L is put on top of the (non-rotated) right image R with the tiles $t_{goal}$ and $t_{match}$ overlapping. However, if the rotation alignment is greater or equal to 3°, the right image R preferable is rotated.

Figure 25A:
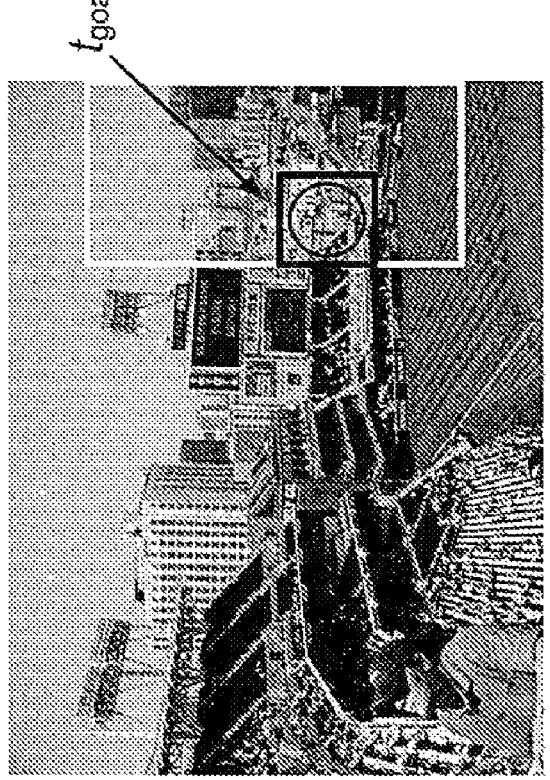
FIG. 25A illustrates the left photographic image of FIG. 8 with $t_{goal}$ designated.
Figure 26A:
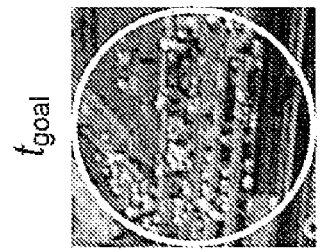
FIG. 26A illustrates the $t_{goal}$ tile.

FIG. 25A illustrates the left photographic image of FIG. 8 with tgoal designated. FIG. 25B illustrates a rotated right photographic image of FIG. 1B with $t_{endPos}$ and $t_{match}$ designated. In FIGS. 25A and 25B, the right image R is rotated by the amount of the alignment rotation and labeled $R_{rotated}$. Using the tile $t_{endPos}$ (FIG. 26C) at the new rotation of the right image $R_{rotated}$, a SAD-only cost function using square tiles is used in a new Modified A*Heuristic Search. The tile $t_{endPos}$ (FIG. 26C) at the new rotation can be labeled the current (rotated) LCEF tile from which to begin searching. The current (rotated) LCEF tile begins a new Modified A*Heuristic Search for a square tile $t_{match}$ (FIG. 26E) in the rotated right image R that best matches the tile $t_{goal}$ (FIG. 26A). In FIG. 25B, the square tile $t_{match}$ is shown as black. As described previously, if the tile $t_{endPos}$ (FIG. 26C) is not rotated, then the tile $t_{match}$ is the tile $t_{endPos}$. This tile $t_{match}$ is the spot to stitch the left image L to the rotated right image $R_{rotated}$.

Figure 28:
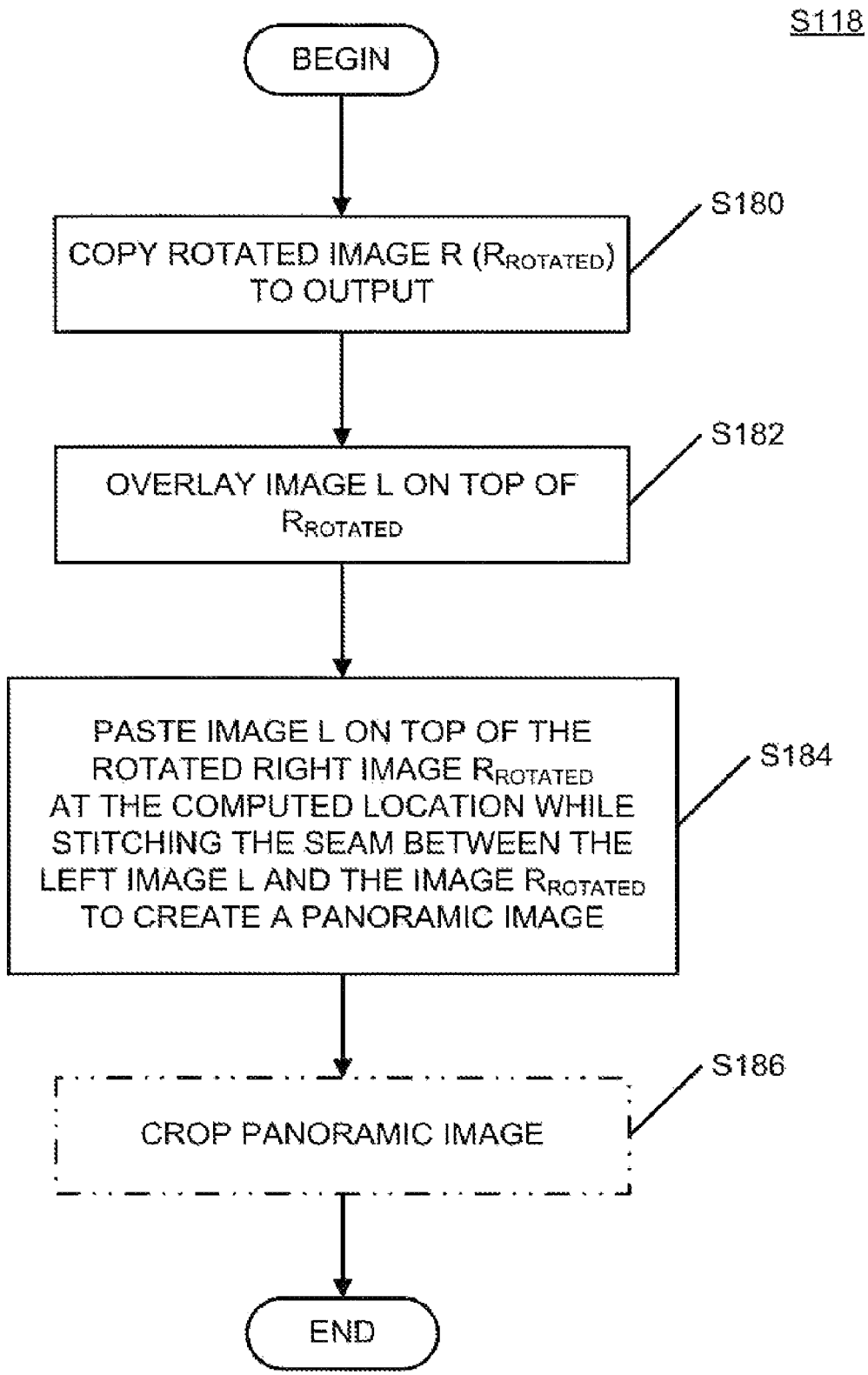
FIG. 28 illustrates a flowchart of the process for stitching the left photographic to the right photographic image.

FIG. 28 illustrates a flowchart of the process for stitching the left photographic to the right photographic image. In FIG. 28, the ideal location to stitch is known. The process of step S118 in FIG. 6B begins with step S180 where the right image R or the rotated right image $R_{rotated}$ is sent to the output. Step S180 is followed by step S182 where the left image is overlaid on top of the right image R or the rotated right image $R_{rotated}$. Step S182 is followed by step S184 where left image L is pasted at the location the tile $t_{goal}$ is stitched on the tile $t_{match}$ while blending the seam between the left and right images. In the exemplary embodiment, alpha blending is used where the right 100 columns of left image L is blended smoothly with what is underneath (the right image R or the rotated right image $R_{rotated}$). The result produces a larger, panoramic image, shown in FIG. 30. Step S184 is followed by step S186 (shown in phantom) where optionally the panoramic image is cropped, represented by the black rectangular line.

Figure 33:
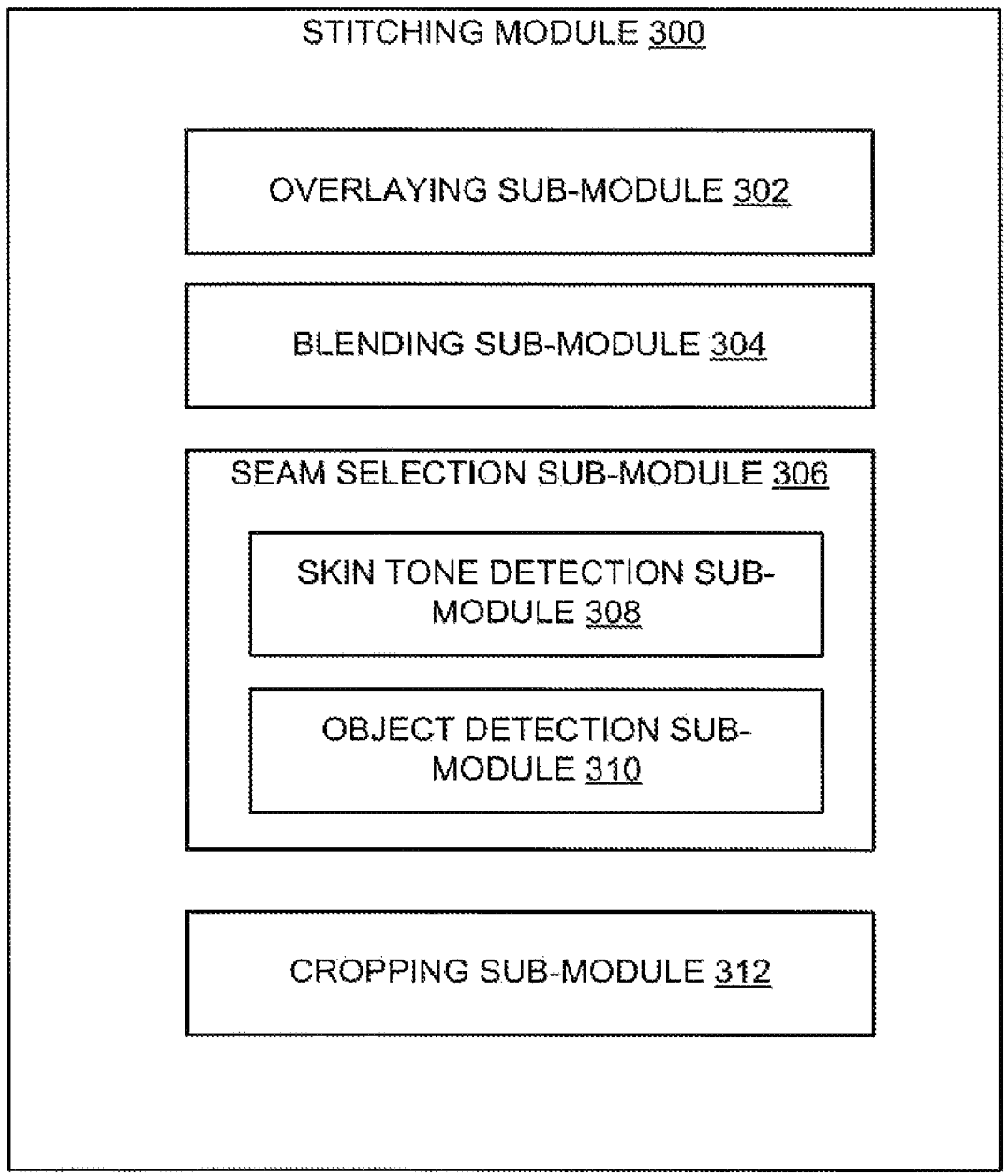
FIG. 33 illustrates a stitching module.

Referring now to FIG. 33, a block diagram of a stitching module 300 is shown. The stitching module 300 includes an overlaying sub-module 302 for performing the functions of step S182 and a blending sub-module 304 for performing the functions of step S184. The stitching module 300 further includes a seam selection sub-module 306 which includes a skin tone detection sub-module 308 and an object detection sub-module 310. Before or during blending of step S184, the skin tone detection and object detection by sub-modules 308 and 310, respectively, may be performed. A cropping sub-module 312 is provided to crop the panoramic image.

The seam may be stitched in a variety of manners or patterns. First a straight line can be used as the seam pattern to stitch the seam. Alternately, the seam pattern may be a wavy line to minimize cutting or stitching through an important object in the scene detected by the object detection sub-module 310. Nevertheless, other seam patterns may be employed. The seam pattern is selected by the seam selection sub-module 306 and may be done automatically.

Figure 4:
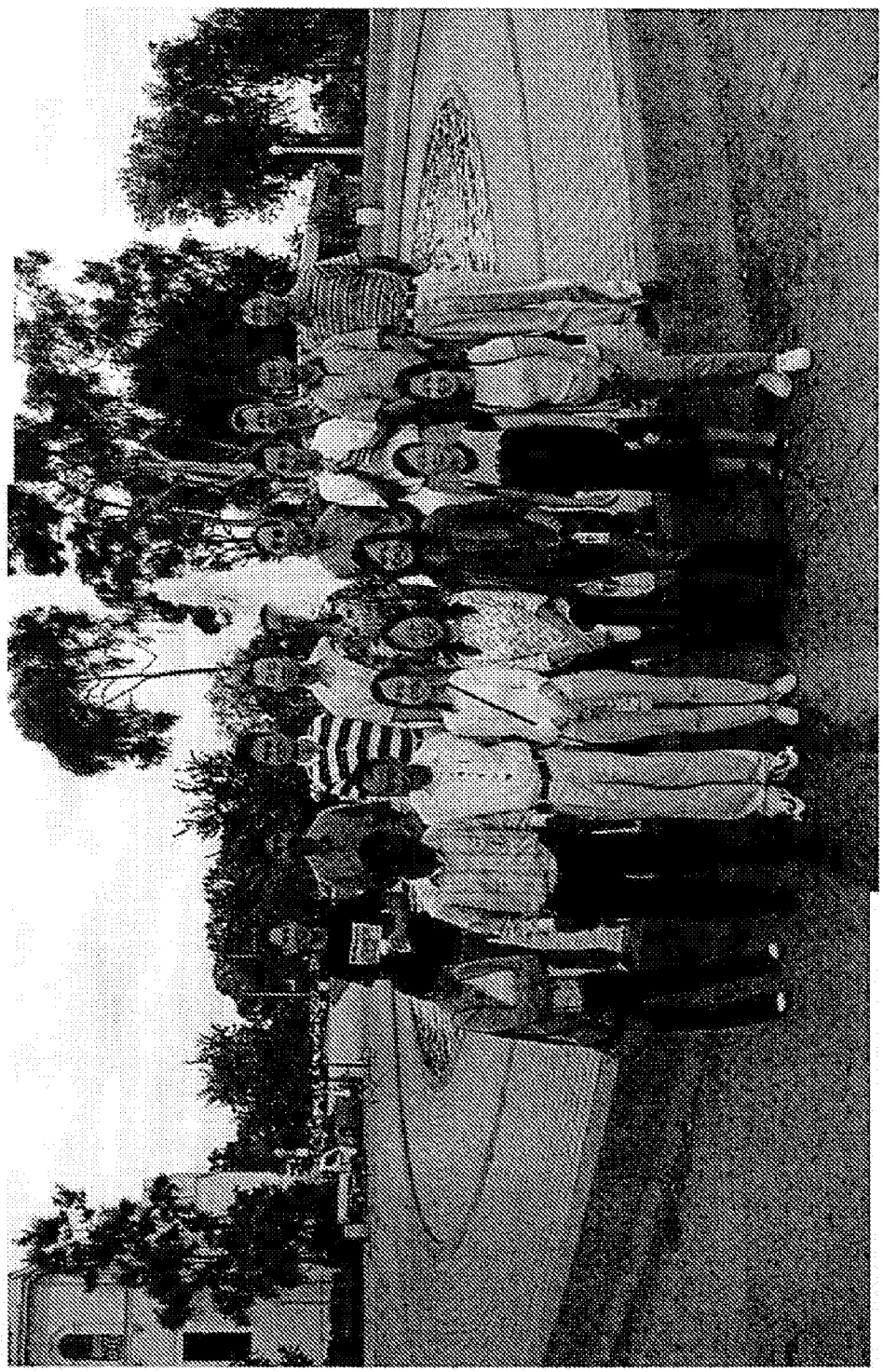
FIG. 4 illustrates a single image representative of the left and right photographic images of FIGS. 3A and 3B using a conventional process.

Furthermore, in the exemplary embodiment, a seam preferably would not fall on someone's face in the panoramic image, as shown in FIG. 4. Thus, a skin tone detection algorithm is employed by the skin tone detection sub-module 308 to prevent placing a seam on someone's face in the images. The pixel colors used in the searches can be used to detect skin or flesh tone.

Figure 3B:
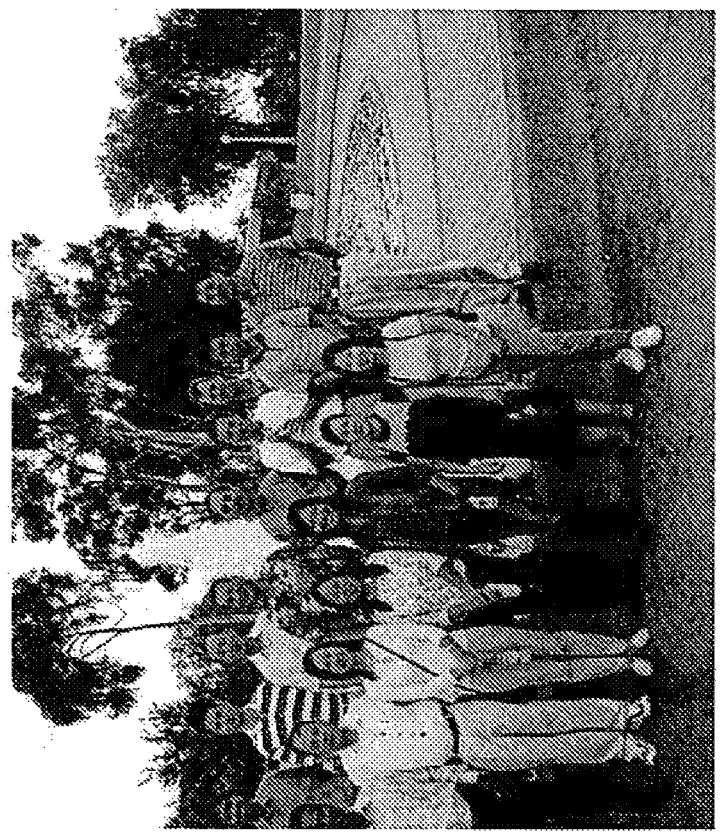
FIGS. 3A and 3B illustrate left and right photographic images of a group picture wherein a portion of the left and right photographic images overlap.
Figure 3A:
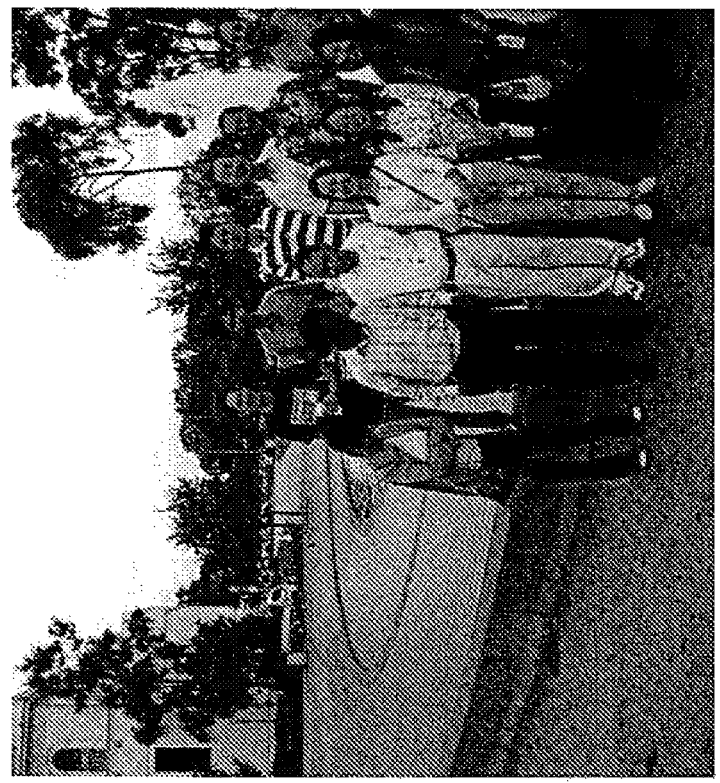
Figure 5:
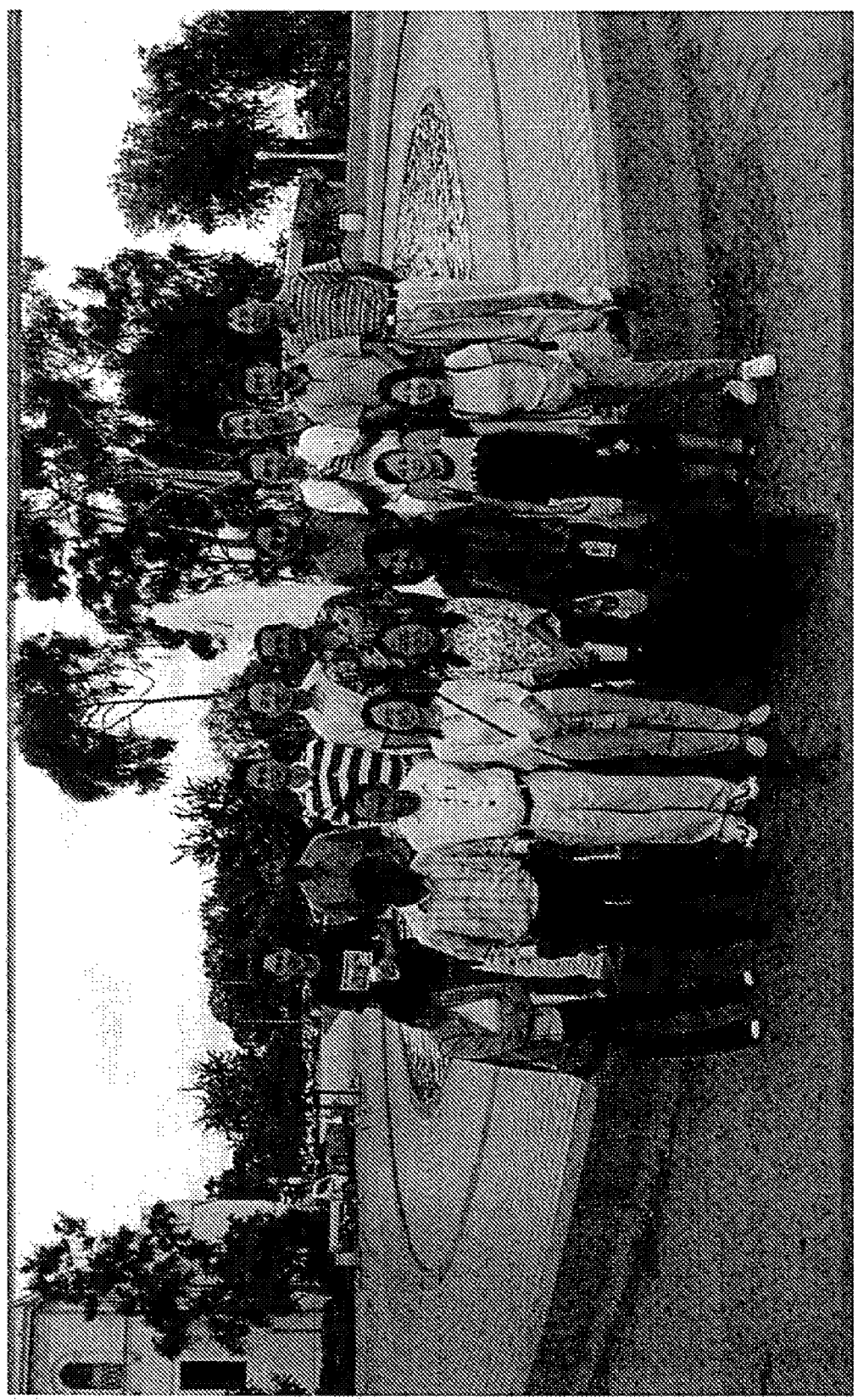
FIG. 5 illustrates a single image representative of the left and right photographic images of FIGS. 3A and 3B using the process to create a panoramic image.
Figure 31B:
FIGS. 31A and 31B illustrate left and right photographic images of a scene at a restaurant wherein a portion of the left and right photographic images overlap and are rotationally offset from each other.
Figure 31A:
Figure 32:
FIG. 32 illustrates a panoramic image representative of the left and right photographic images of FIGS. 31A and 31B using the process to create a panoramic image.

FIGS. 31A and 31B illustrate left and right photographic images of a scene at a restaurant wherein a portion of the left and right photographic images overlap. These images are also at different rotations. The resultant larger panoramic image representative of the left and right photographic images of FIGS. 31A and 31B using the process 100 is shown in FIG. 32. The seam falls between two people and not over their faces. The conventional process could not create a panoramic image using two images of FIGS. 31A and 31B at different rotations. Thus, the embodiment described herein provides rotation-independent image stitching by finding and correcting for rotational differences prior to stitching. In FIG. 5, the resultant panoramic image using the exemplary embodiment described herein using the left and right photographic images of FIGS. 3A and 3B is shown. In FIG. 5, the seam does not cut through the face of a person as did the conventional process shown in FIG. 4.

In view of the foregoing, the embodiment described herein provides a wireless device 10 capable of seamlessly compositing together two images taken of a scene from different perspectives or rotations provided there is some common overlapping region. The wireless device 10 is also capable creating a panoramic image in the camera device with a relatively small increase in memory.

Furthermore, as can be readily appreciated, the wireless device 10 is capable of optimizing the process 100 for creating a panoramic image by eliminating the rotation correction when the rotation between the two images is below a threshold or lower limit. Moreover, the process compensates for lighting difference between the two images.

In one or more exemplary embodiments, the functions described may be implemented in hardware, software, firmware, or any combination thereof. If implemented in software, the functions may be stored on or transmitted over as one or more instructions or code on a computer-readable medium or machine-readable medium. Computer-readable media or machine-readable media includes both computer storage media and communication media including any medium that facilitates transfer of a computer program from one place to another. A storage media may be any available media that can be accessed by a computer. By way of example, and not limitation, such computer-readable media or machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium or machine-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable readable media or machine-readable media.

Furthermore, it is known to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

The embodiments described herein are related to a camera phone device 10, a camera device or other wireless device having a camera. However, the process 100 described herein can be also used by a personal computer (PC), laptop, or other computing device.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A wireless device comprising:
a processor operative to stitch together a first image and a second image having overlapping regions and to automatically correct for rotational differences between the first and second images before stitching to create a larger panoramic image including automatically finding a stitching location in the second image to stitch to the first image, wherein the processor is operative to:
 automatically find a goal tile in a constrained area array of tiles in a common overlapping region of the first image including determining which tile, in the constrained area array of tiles of the first image, is most unique amongst neighboring tiles and has a histogram which has a most even distribution of luma and chroma to set as the goal tile;
 reduce the second image by a predetermined reduction factor to form a reduced second image with a reduced common overlapping region;
 find a starting tile in an array of candidate tiles of the reduced common overlapping region, initiating a search in the common overlapping region of the second image at a predetermined radius from the starting tile wherein the search is used to find the stitching location in the second image;
 determine which tile, in the array of candidate tiles of the reduced common overlapping region, best matches the goal tile based on a comparison of a histogram of luma and a sum of absolute difference (SAD) for each respective candidate tile with respect to the goal tile to set as the starting tile;
 correct the second image for rotational differences with the first image in relation to the stitching location;
 form a new rotated location; and
 stitch the first image to the second image to generate the larger panoramic image using the new rotated location; and
a memory coupled to the processor.

2. The device of claim 1, wherein the processor is further operative to:
 explore systematically, a set of candidate tiles in an array of candidate tiles at the predetermined radius from the starting tile to find a current lowest cost on the horizon (H) tile and track a current lowest cost ever found (LCEF) tile for the predetermined radius;
 explore, systematically, a new set of candidate tiles in the array of candidate tiles at the predetermined radius from the current H tile for the predetermined radius to determine a new lowest cost on a horizon (NH) tile and track the current LCEF tile;
 determine whether a cost associated with the NH tile is greater than a cost associated with the LCEF tile multiplied by an overshoot value;
 reduce the predetermined radius to form a new reduced radius when the NH tile is determined to be greater;
 repeat the exploring of the new set of candidate tiles from the current LCEF tile using the predetermined radius set to the reduced radius unless the reduced radius is an end radius; and
 repeat the exploring for the new set of candidate tiles wherein the NH tile is set to the current H tile, when the NH tile is determined to be not greater.

3. The device of claim 2, wherein when the processor is operative to explore the set of candidate tiles in the array of candidate tiles, the processor is further operative to:
 create a goal histogram array of the goal tile; create, for each candidate tile at the predetermined radius from the starting tile, a candidate histogram array;
 subtract the goal histogram array from the candidate histogram array for each respective one candidate tile to create a histogram difference result for said each respective one candidate tile at the predetermined radius;
 determine for said each respective one candidate tile at the predetermined radius a SAD result of the goal tile with the candidate tile at the predetermined radius;
 weight the histogram difference result to form a weighted histogram difference result;
 weight the SAD result to form a weighted SAD result; and
 add together the weighted histogram difference result and the weighted SAD result for said each respective one candidate tile to form a cost associated with said each respective one candidate tile.

4. The device of claim 3, wherein when the processor is operative to explore the new set of candidate tiles, the processor is further operative to:
 create for each candidate tile at the predetermined radius from the current H tile, a candidate histogram array;
 subtract the goal histogram array from the candidate histogram array, for said each respective one candidate tile associated with the current H tile, to create a histogram difference result for said each respective one candidate tile associated with the current H tile;
 determine, for said each respective one candidate tile associated with the current H tile, a SAD result of the goal tile with the candidate tile associated with the current H tile;

weight the histogram difference result, for said each respective one candidate tile associated with the current H tile, to form a weighted histogram difference result;

weight the SAD result, for said each respective one candidate tile associated with the current H tile, to form a weighted SAD result; and add together the weighted histogram difference result and the weighted SAD result for said each respective one candidate tile to form the cost associated with said each respective one candidate tile associated with the current H tile.

5. The device of claim 4, wherein each of the goal histogram array and the candidate histogram array comprises: values for brightness or Luma (Y), an amount of blue (Cr) and an amount of red (Cr) and a plurality of common Hues in hue, saturation and value (HSV space) of a pixel.

6. A computer program product comprising a non-transitory, computer-readable medium storing processor executable instructions for causing the processor to:

automatically find a goal tile in a constrained area array of tiles in a common overlapping region of a first image by determining which tile, in the constrained area array of tiles of the first image, is most unique amongst neighboring tiles and has a histogram having a most even distribution of luma and chroma to set as the goal tile;

reduce a second image by a predetermined reduction factor to form a reduced second image with a reduced common overlapping region;

find a starting tile in an array of candidate tiles of the reduced common overlapping region by initiating a search in a common overlapping region of the second image at a predetermined radius from the starting tile to determine which tile, in the array of candidate tiles of the reduced common overlapping region, best matches the goal tile based on a comparison of a histogram of luma and a sum of absolute difference (SAD) for each respective candidate tile with respect to the goal tile to set as the starting tile, wherein the search is further used to find a stitching location in the second image;

correct the second image for rotational differences with the first image in relation to the stitching location;

form a new rotated location; and stitch the first image to the second image to generate a panoramic image using the new rotated location.

7. The computer program product of claim 6, wherein the instructions for causing the processor to find the stitching location comprise instructions for causing the processor to:

explore, systematically during the search, a set of candidate tiles in an array of candidate tiles at the predetermined radius from the starting tile to find a current lowest cost on the horizon (H) tile and tracking current lowest cost ever found (LCEF) tile for the predetermined radius;

explore, systematically, a new set of candidate tiles in the array of candidate tiles at the predetermined radius from the current H tile for the predetermined radius to determine a new lowest cost on horizon (NH) tile and tracking the current LCEF tile;

determine whether a cost associated with the NH tile is greater than a cost associated with the LCEF tile multiplied by an overshoot value;

reduce the predetermined radius to form a new reduced radius, when the NH tile is determined to be greater;

repeat the program instruction operable to the explore for the new set of candidate tiles from the current LCEF tile using the predetermined radius set to the reduced radius unless the reduced radius is an end radius; and repeat the program instructions operable to explore for the new set of candidate tiles wherein the NH tile is set to the current H tile, when the NH tile is determined to be not greater.

8. The computer program product of claim 7, wherein the instructions for causing the processor to explore for the set of candidate tiles comprise instructions for causing the processor to:

create a goal histogram array of the goal tile;

create, for each candidate tile, at the predetermined radius from the starting tile, a candidate histogram array;

subtract the goal histogram array from the candidate histogram array for each respective one candidate tile to create a histogram difference result for said each respective one candidate tile at the predetermined radius;

determine, for said each respective one candidate tile at the predetermined radius, a SAD result of the goal tile with the candidate tile at the predetermined radius;

weight the histogram difference result to form a weighted histogram difference result;

weight the SAD result to form a weighted SAD result; and add together the weighted histogram difference result and the weighted SAD result for said each respective one candidate tile to form a cost associated with said each respective one candidate tile.

9. The computer program product of claim 8, wherein the instructions for causing the processor to explore for the new set of candidate tiles comprise instructions for causing the processor to:

create for each candidate tile, at the predetermined radius from the current H tile, a candidate histogram array;

subtract the goal histogram array from the candidate histogram array for each respective one candidate tile associated with the current H tile to create a histogram difference result for said each respective one candidate tile associated with the current H tile;

determine, for said each respective one candidate tile associated with the current H tile, a SAD result of the goal tile with the candidate tile associated with the current H tile;

weight the histogram difference result, for said each respective one candidate tile associated with the current H tile, to form a weighted histogram difference result;

weight the SAD result, for said each respective one candidate tile associated with the current H tile, to form a weighted SAD result; and add together the weighted histogram difference result and the weighted SAD result for said each respective one candidate tile to form the cost associated with said each respective one candidate tile associated with the current H tile.

10. The computer program product of claim 9, wherein each of the goal histogram array and the candidate histogram array comprise: values for brightness or Luma (Y), an amount of blue (Cr) and an amount of red (Cr) and a plurality of common Hues in hue, saturation and value (HSV space) of a pixel.

11. A method comprising:

automatically finding a goal tile in a constrained area array of tiles in an overlapping region of a first image by determining which tile, in the constrained area array of tiles of the first image, is most unique amongst neighboring tiles and has a histogram which has a most even distribution of luma and chroma to set as a goal tile;

reducing a second image by a predetermined reduction factor to form a reduced second image with a reduced overlapping region of the second image;

finding a starting tile in an array of candidate tiles of the reduced overlapping region including determining which tile, in the array of candidate tiles of the reduced common overlapping region, best matches the goal tile based on a comparison of a histogram of luma and a sum of absolute difference (SAD) for each respective candidate tile with respect to the goal tile to set as the starting tile;

initiating a search in the reduced overlapping region of the second image at a predetermined radius from the starting tile to find a stitching location in the second image;

correcting the second image for rotational differences with the first image in relation to the stitching location;

forming a new rotated location; and stitching the first image to the second image to generate a panoramic image using the new rotated location.

12. The method of claim 11, wherein the method is carried out by a processor in a wireless device.

13. The method of claim 11, wherein initiating a search to find the stitching location comprises systematically exploring a set of candidate tiles in an array of candidate tiles at the predetermined radius from the starting tile to find a current lowest cost on the horizon (H) tile and tracking current lowest cost ever found (LCEF) tile for the predetermined radius.

* * * * *